United States Patent [19]

Orloff et al.

[11] Patent Number: 4,872,120

[45] Date of Patent: Oct. 3, 1989

[54] MULTIPLEXED JUNCTION PROBE FOR FUEL GAGING SYSTEM AND SYSTEM CONTAINING SAME

[75] Inventors: Eugene F. Orloff, Long Beach, Calif.; Martin Horowitz, Lynbrook; Charles H. Rittner, Great River, both of N.Y.

[73] Assignees: Gull Inc., Smithtown, N.Y.; McDonnell Douglas Corporation, Long Beach, Calif.

[21] Appl. No.: 184,271

[22] Filed: Apr. 21, 1988

Related U.S. Application Data

[63] Continuation of Ser. No. 685,396, Dec. 20, 1984.

[51] Int. Cl.4 .................. G06G 7/57; B64D 37/00; G08B 5/36; G01F 23/00
[52] U.S. Cl. .................. 364/509; 244/135 C; 73/304 C; 340/825.15; 340/825.13; 340/945; 364/550; 364/564
[58] Field of Search .............. 364/509, 564, 900, 550, 364/558; 73/304 C, 304 R; 340/825.05, 825.15, 870.13, 945

[56] References Cited

U.S. PATENT DOCUMENTS

| | | | |
|---|---|---|---|
| 2,969,803 | 1/1961 | Mosher | 244/135 C |
| 4,053,714 | 11/1977 | Long | 340/870.13 |
| 4,180,860 | 12/1979 | Driscoll et al. | 364/900 |
| 4,234,926 | 11/1980 | Wallace et al. | 364/900 |
| 4,388,828 | 6/1983 | Dougherty | 364/509 |
| 4,434,421 | 2/1984 | Baker et al. | 340/825.51 |
| 4,451,894 | 5/1984 | Dougherty et al. | 73/304 C |
| 4,454,577 | 6/1984 | Constantini et al. | 364/550 |
| 4,488,232 | 12/1984 | Swaney et al. | 364/200 |
| 4,553,216 | 11/1985 | Stevens et al. | 364/558 |
| 4,570,257 | 2/1986 | Olson et al. | 340/825.51 |
| 4,591,115 | 5/1986 | DeCarlo | 244/135 C |
| 4,626,966 | 12/1986 | Arlott | 364/550 |

OTHER PUBLICATIONS

MIL-STD-1553 B, Sep. 21, 1978, U.S. Dept. of Defense.

*Primary Examiner*—Parshotam S. Lall
*Assistant Examiner*—Joseph L. Dixon
*Attorney, Agent, or Firm*—Henry M. Bissell; George W. Finch; Gregory A. Cone

[57] ABSTRACT

A true mass fuel gaging system for aircraft utilizing multiplexing of tank unit measurements in or adjacent a fuel tank for improved accuracy and fault isolation. The system provides dual equipment channels for redundancy throughout all data processing portions of the system and also uses extensive built-in testing (BIT) routines so that upon detection of a fault an alternative channel can be switched into use. Detected fault locations are displayed in the cockpit with the fuel quantity displays. The system also provides displays of center of gravity measurements derived from fuel mass and location.

52 Claims, 10 Drawing Sheets

MULTIPLEXED JUNCTION PROBE FOR FUEL GAGING SYSTEM AND SYSTEM CONTAINING SAME

This is a continuation of application Ser. No. 685,396, filed Dec. 20, 1984.

BACKGROUND OF THE INVENTION

1. Field of the Invention

This invention relates to aircraft fuel gaging systems and, more particularly, to systems utilizing individual multiplexed junction probes in separate fuel tanks.

2. Description of the Prior Art

Known aircraft fuel gaging systems of the prior art typically employ a plurality of probes in each of the separate fuel tanks connected in parallel to develop signals indicating the volume of fuel in each tank. These probes comprise capacitors which are connected so that their admittance varies linearly as an analog function of quantity of fuel in the tank. A compensating capacitor in each tank, totally submerged in the fuel, provides another analog indication that varies with the density of the fuel, based on a predetermined calibration relating the compensating capacitor to density variations of fuels within a standard range. These signals are sometimes directed to master indicators in the cockpit panel which include various circuitry to convert the analog signals to digital output which drive cockpit displays. These signals are also sometimes directed to repeater displays in the aircraft refueling panel.

Gaging systems of the type described, while reasonably accurate for fuels within the standard range for which the compensating capacitors are calibrated, are subject to increased errors in fuel quantity measurement when other, non-standard fuels are used. Such fuel gaging systems depend for accuracy on precise control of the type or class of fuel in the tanks. Because of the variation in quality control in the fuels provided at some airports and because of fuels being refined from new sources of crude oil, there is a much greater variation encountered in present fuel density than was previously the case when the described fuel gaging systems were designed. The typical variation leads to a three or four percent error in fuel quantity measurement. The DC-10 airliner, for example, typically carries 250,000 pounds of fuel; thus, maintaining a reasonable reserve requires carrying at least 10,000 pounds of fuel because of possible errors in the reading of the fuel gaging system as described, due to possible deviations from the standard compensating capacitor calibration.

An improved aircraft fuel gaging system is disclosed in U.S. Pat. No. 4,420,976 entitled Multiplexed True Mass Gaging System of Eugene F. Orloff, Martin Horowitz and Charles H. Ritter, co-inventors of the present application. The system disclosed in that patent incorporates a densitometer in each of the individual fuel tanks, in addition to the plurality of probes and the associated compensating capacitor, to develop a signal indicative of the true mass of the fuel in the respective tanks. In addition, the system of that patent incorporates signal processing apparatus which is coupled between the fuel tank probes and the fuel quantity displays for generating display readouts in accordance wtih tank signals. That signal processing system provides duplication of components in dual channels (for redundancy) over most of the signal path and includes a standard electronic module (SEM) mounted near the central connections to the fuel tank probes and containing appropriate signal conversion, processing and multiplexing stages in duplicate, dual data busses extending from the standard electronic module to the cockpit and refueling panels, respectively, and dual-channel signal-receiving and -processing stages at the cockpit panel as well as dual-channel signal-receiving capability at the refueling panel. A multiplexer is coupled to receive signals derived from the probes and compensator in each tank and to apply those signals in multiplexed form to an A/D (analog-to-digital) converter which in turn provides a digitized output to a microprocessor. The microprocessor applies a data stream, corresponding to the digitized signals, to signal busses leading respectively to the cockpit panel and to the refueling panel. Each data bus is a single shielded, twisted pair of conductors. In the display units, each signal path includes a data receiver coupled to the incoming data bus for providing an output to a demultiplexer which supplies demultiplexed signals to display drivers and associated signal combining stages. The reader is referred to that patent for a more detailed description of the disclosed multiplexed true mass gaging system, and the disclosure of that patent is incorporated herein by reference.

In known prior systems which use junction probes or functionally similar devices that connect in parallel to a plurality of individual tank units in respective fuel tanks, the difficulty of fault isolation of tank components with the concomitant drawn-out trouble-shooting procedures is a significant and costly maintenance problem. To accomplish fault isolation of tank components which would substantially reduce the time and cost of maintenance would, in the system of the cited patent, require bringing out individual wires from each tank unit and compensator to the signal processor unit. Such an approach would substantially increase the number of wire terminations and would also increase the weight of the wiring, the wiring support hardware and associated feedthroughs and connectors.

It will be appreciated that each individual component of installed instrumentation systems on an aircraft represents an increment of dead weight which subtracts from the load carrying capability of the aircraft. Thus, each of the individual fuel tank units, of which there are several in each tank, represents added dead weight; this weight factor is increased by the associated wiring, mounting brackets, etc. which are required for the individual probes. In addition, in the described prior art systems, the failure or inaccuracy of reading from a single tank unit affects the accuracy of the fuel quantity reading for the entire tank. The system of the cited patent incorporates particular circuitry for detecting such inaccurate readings and providing a fault indication to the cockpit display.

SUMMARY OF THE INVENTION

The present invention represents an improved fuel gaging system relative to the multiplexed true mass gaging system of the prior patent. Many of the design considerations and system aspects of the prior patented system are incorporated in the instant invention, and the present invention represents an extension of the design philosophy thereof with the addition of particular features which achieve circuit and component simplification, weight reduction, improvement in reliability, enhancement of the information presented at the Flight Engineer's Panel in the cockpit and at the refueling panel displays, and adds to the overall capabilities of the system. While the present invention is disclosed in the context of an aircraft fuel gaging system in which a multiplexed junction probe is used to combine data signals from a plurality of sensing units within a fuel tank, it will be appreciated that the principles of the invention are applicable to other equivalent fuel measurement configurations such as, for example, a multiplexer which is associated with the tank units in other than a junction probe configuration. Such a multiplexer may be in the form of a multiplexing unit which is installed inside a fuel tank or at some location outside the tank (e.g., a multiplexed bulkhead connector) to which the electrical connections from the individual tank units are brought for multiplexed signal processing along lines of the operating procedures disclosed herein.

In accordance with one particular aspect of the present invention, one or more multiplexed junction probes or functionally similar devices are provided in each of the fuel tanks to avoid the need for running separate wires for each individual tank unit from the tank probe to the signal processor unit. This multiplexed junction probe is designed to be substantially compatible, physically and electrically, with the existing tank junction probes so that it can replace the junction probes on existing aircraft. The multiplexed junction probe incorporates a signal modulator which transmits data in serial form corresponding to the conditions of the individual tank components over the existing three-wire unified cable. In the event of the failure of an individual tank component, the signal of that particular component is missing from the serial sequence of the signal data stream and is threfore not picked up by the signal processor unit. As a result, the signal processor unit activates a fault annunciation circuit to display the identity of the failed component.

In accordance with another aspect of the invention, the present system provides for dynamic monitoring of aircraft center of gravity (CG). This is based on the zero fuel center of gravity (ZFCG) and the CG due to fuel. The fuel CG is determined by its mass and its location (moment arm). Individual tank units, sequentially monitored by the multiplexed junction probes, provide the fuel quantity (mass) information. Data stored in system memory, determined from the fuel tank height vs. volume curves, are used to derive the moment arm information. These signals are processed in the signal processor unit and a resultant display is provided in the cockpit in analog (bar-graph) and in digital form indicating the location of the aircraft longitudinal CG. This system also provides a lateral unbalance warning signal to alert the crew to an unbalanced fuel situation between symmetrical wing tanks so that action can be taken to pump fuel from one tank to another to correct the unbalance.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figure 1:
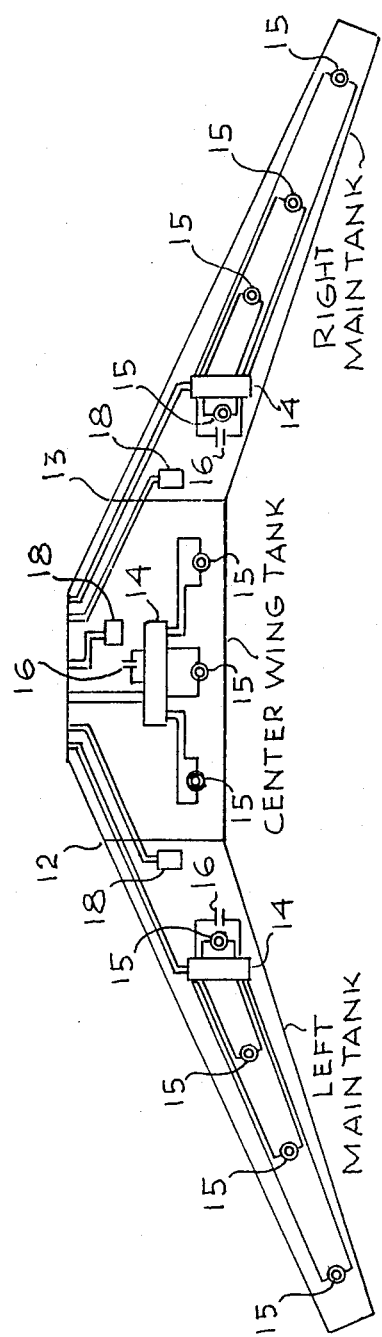
FIG. 1 is a schematic diagram representing the layout of a fuel tank component in the fuel gaging system of the above-referenced patent.

FIG. 1 represents schematically the typical layout of various tank components in the fuel gaging system of the above-referenced U.S. Pat. No. 4,420,976. In the diagram of FIG. 1, the aircraft wing is shown separated by bulkheads 12 and 13 into three distinct tanks, a left main tank, a right main tank and a center wing tank. Each of the tanks is shown containing a junction probe 14 to which are connected a plurality of individual tank units 15 constituting level measuring capacitors dispersed throughout the associated tank. In addition, each tank contains a compensating capacitor 16 connected to its junction probe 14. In FIG. 1, all of the individual tank units 15 and the compensating capacitor 16 of a given tank are connected in parallel to the associated junction probe 14, from which wire connecting leads are fed to associated signal processing equipment (not shown). In addition to the junction probe 14 and capacitors 15 and 16, each tank also includes a densitometer 18 from which leads are connected to the same signal processing equipment.

Since the capacitors 15 and 16 of a given tank are connected in parallel to the associated junction probe 14, it is impossible for the signal processing equipment associated with that system to determine which of the individual tank components may have developed a fault, although the existence of a fault can sometimes be detected from the change in the total tank component capacitance from the known correct range of values. Localization of the fault is a relatively long drawn-out process involving physically disconnecting each capacitor 15 or 16 from the junction probe 14 and checking each one individually.

In systems in accordance with the present invention, the so-called passive junction probes 14 of FIG. 1 are replaced by multiplexed junction probes (MJPs) in accordance with the invention. The MJPs are directly interchangeable with corresponding passive units, with respect to form and fit. Minor wiring differences are accommodated in the in-tank wiring harnesses.

Figure 2:
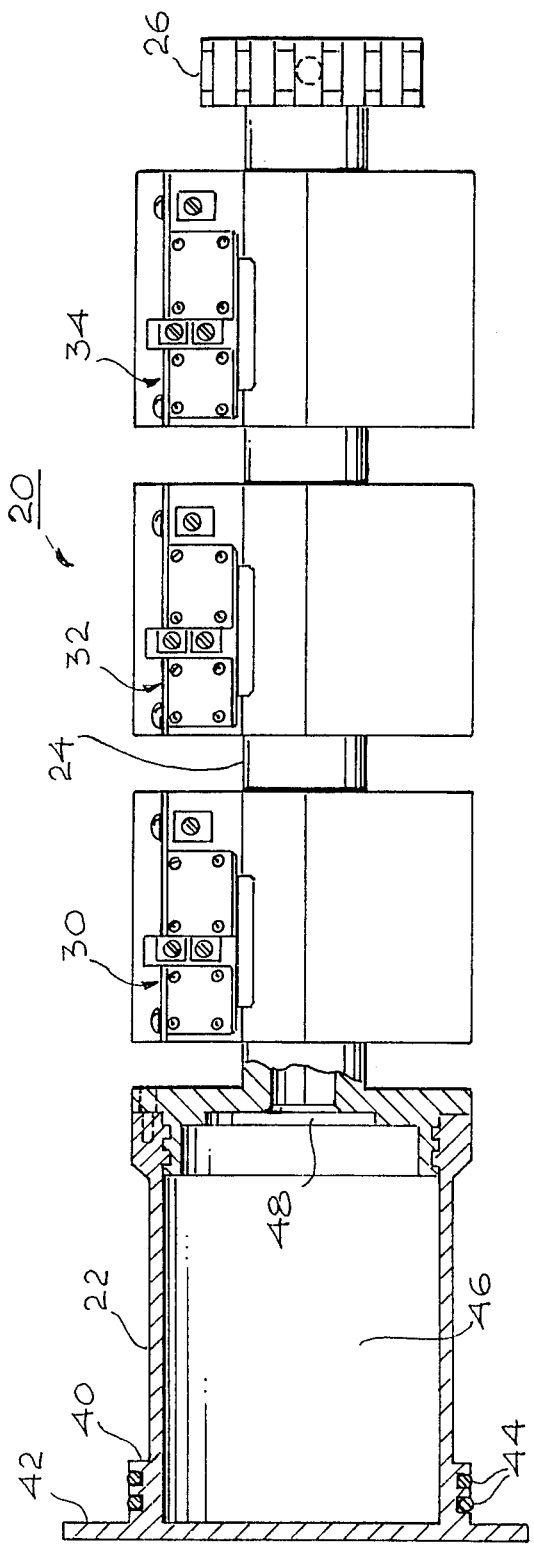
FIG. 2 is a side elevation, partially in section, showing the structural configuration of a multiplexed junction probe in accordance with the present invention.
Figure 3:
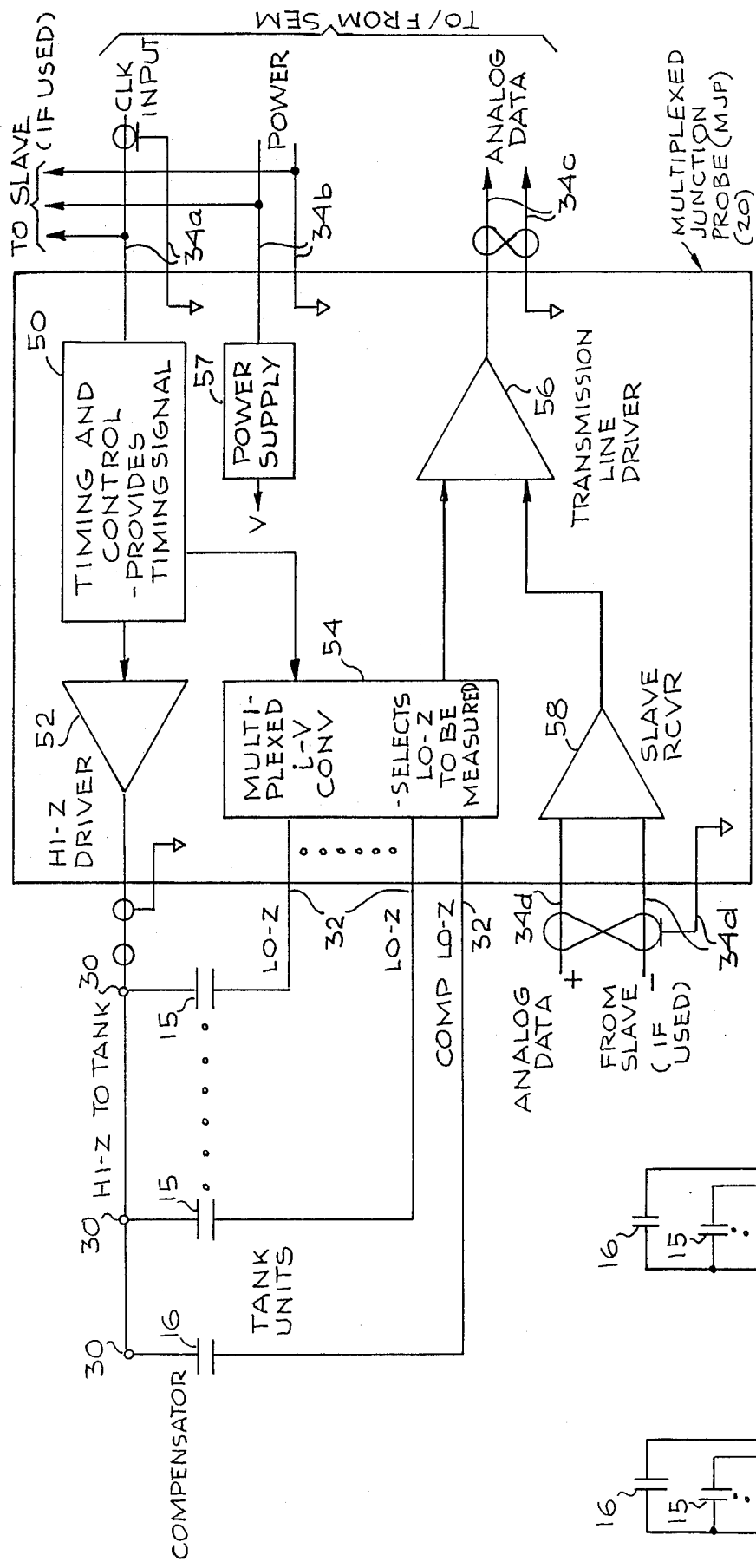
FIG. 3 is a schematic block diagram of the multiplexed junction probe of FIG. 2.

One such multiplexed junction probe 20 is depicted in FIG. 2 and its corresponding circuit configuration is represented in the block diagram of FIG. 3. As particularly shown in FIG. 2, the junction probe 20 includes a main housing 22 from which a hollow cylindrical mounting tube 24 extends. A strain relief bracket 26 is positioned at the free end of the mounting tube 24. Respective pluralities of High Junction terminals 30 (Hi-Z), Low Junction terminals 32 (Lo-Z) and Interconnect Junction terminals 34 are shown mounted on the mounting tube 24. The housing 22 is formed with outwardly extending collar 40 and housing flange 42 for mounting in the opening already provided in existing aircraft tanks for the junction probes 14 of FIG. 1. O-rings 44 are shown mounted on the collar 40 for sealing the opening with the junction probe 20 mounted therein.

When a multiplexed junction probe 20 is installed in a fuel tank, individual tank units such as a fuel quantity measuring capacitor 15 and the compensating capacitor 16 are connected between respective Hi-Z terminals 30 and Lo-Z terminals 32, shown in FIG. 2. Individual connecting wires are then run from these respective terminals 30, 32 through grommeted holes (not shown) in the mounting tube 24 and along the interior thereof to the circuitry of FIG. 3 which is physically located within a central chamber 46 within the housing 22. This chamber 46 is double O-ring sealed and contains the various electronic components shown within the block outline in FIG. 3. Connections between the wiring to the individual tank components and the circuitry within the chamber 46 are by means of feed-through interface connectors 48, as are also the connections from the interior circuitry to wires leading along the bore of the tube 24 and outwardly to the interconnect junction terminals 34. Wires from the in-tank wiring harness are secured in the strain relief bracket 26 and extend to the terminals 34 to complete the connections to the junction probe 20.

As shown in the schematic block diagram of FIG. 3, the Multiplexed Junction Probe (MJP) 20 comprises a timing and control stage 50 coupled to provide signals to a Hi-Z driver 52 and a multiplexed current-to-voltage (i/v) converter 54. These signals are developed in synchronism with a clock input signal from a Standard Electronics Module (SEM), shown in FIG. 4. The timing and control stage 50 generates a triangular-shaped excitation signal applied to the Hi-Z driver 52 in response to each individual clock signal. Corresponding timing signals are also applied to the multiplexed converter 54 which selects the particular Lo-Z line 32 to be measured and provides conversion of current to voltage signals in order to measure the capacitance of each individual tank component (tank units 15 and compensator 16) in sequence. The resultant voltages are encoded by the converter 54 and applied to a transmission line driver 56 which supplies the voltage signals as an analog data stream back to the SEM. Power supply 57 provides regulated power for the components in the Multiplexed Junction Probe 20.

The timing and control (T/C) stage 50 receives the timing signal provided by the SEM and uses this signal to increment a counter included in the T/C stage. The output of the counter is applied to both the Hi-Z driver 52 and the multiplexed i/v converter 54. The T/C stage 50 also includes circuitry to reset its counter in response to a periodic pulse burst on the clock input line 34a for synchronization to the SEM.

The Hi-Z driver 52 is an integrator which responds to an input square wave and develops an output to drive the Hi-Z side of all tank elements 15, 16. This Hi-Z driving signal is a triangular wave of approximately 16 volts peak-to-peak and approximately 1 KHz frequency, used to excite all of the tank elements.

The converter 54 multiplexes the Lo-Z inputs to all tank elements and provides a corresponding output voltage signal. As the counter in the T/C stage 50 is incremented, the Lo-Z of each tank element 15, 16 is converted from a current to a voltage signal in turn and supplied at the output of the converter 54. As a consequence, the capacitance information for all of the tank elements is encoded into an analog data stream and applied to the transmission line driver 56. In addition to the individual tank unit and compensator signals, the converter stage 54 also provides a representation of the Hi-Z waveform used by the SEM to provide automatic gain correction.

The multiplexed junction probe 20 may be wired in two different system configurations, using two different versions to adapt to the requirements of an aircraft. Both versions are built using the same printed circuit cards (or boards) with delineation between the two being provided by the insertion or deletion of individual circuit components.

The two different system configurations are the "14 input MJP" and the "14 input master MJP". The 14 input MJP has the capability of encoding up to 14 tank elements into an analog data stream, and transmitting the data either to the SEM or to a 14 input master MJP. When used together, the 14 input master MJP and the 14 input MJP function as a master/slave configuration. In such a combination, the 14 input master MJP receives a data stream from the 14 input MJP used as slave. The 14 input master MJP encodes its 14 tank elements updated onto the data stream received from the slave MJP and retransmits all of the data to the SEM. This master/slave configuration allows the existing locations of one junction probe on the main tank and one junction probe on the tip tank to be retained, with only the type of junction probe being changed and power leads added, as required, to retrofit a given aircraft.

Figure 3A:
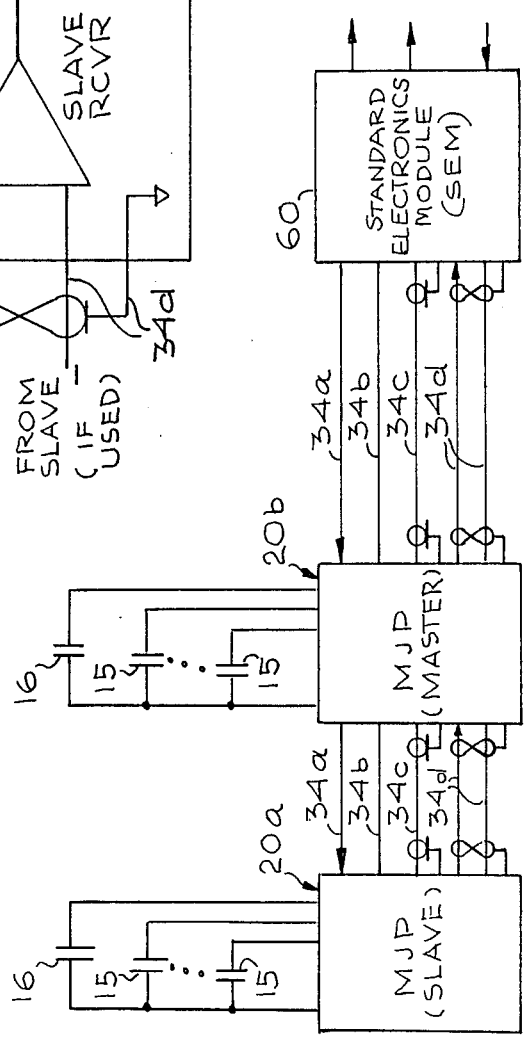
FIG. 3A shows a typical interconnection of two MJPs of FIG. 3 in a master/slave configuration.

Such a combination is illustrated in FIG. 3A, which shows a slave MJP 20a connected to a master MJP 20b which is in turn connected to the SEM 60. Each MJP unit is connected to an associated plurality of tank units 15, 16 and operates with respect to the units 15, 16 and the SEM 20 in the manner indicated in FIG. 3.

When a master/slave combination is utilized, the data stream from the transmission line driver 56 in the slave unit is applied to a slave receiver 58 in the master unit via a twisted shielded pair of leads 34d, which in turn applies the data stream to the transmission line driver 56 thereof for combination with converted signals from the converter 54.

The analog data stream from the output of the transmission line driver 56 is applied along the twisted shielded pair cable 34c. This data stream is an amplitude-varying square wave in a form of Pulse Amplitude Modulation (PAM) where the amplitude of each pulse is directly proportional to measured capacitance of a tank unit 15 or 16, depending on time, in addition to the representation of Hi-Z waveform for system gain correction. The driver 56 is a balanced differential amplifier having a source impedance approximately equal to the characteristic impedance of the twisted shielded pair cable 34c. This circuit provides immunity from cabling loading problems, low radiated emissions, and fast response.

The clock pulse input from the SEM is provided on coaxial shielded wire 34a which terminates in its characteristic impedance at the multiplex junction probe of FIG. 3. The receiver for these clock pulses is transformer isolated to provided noise immunity, DC isolation and lightning protection.

Figure 6:
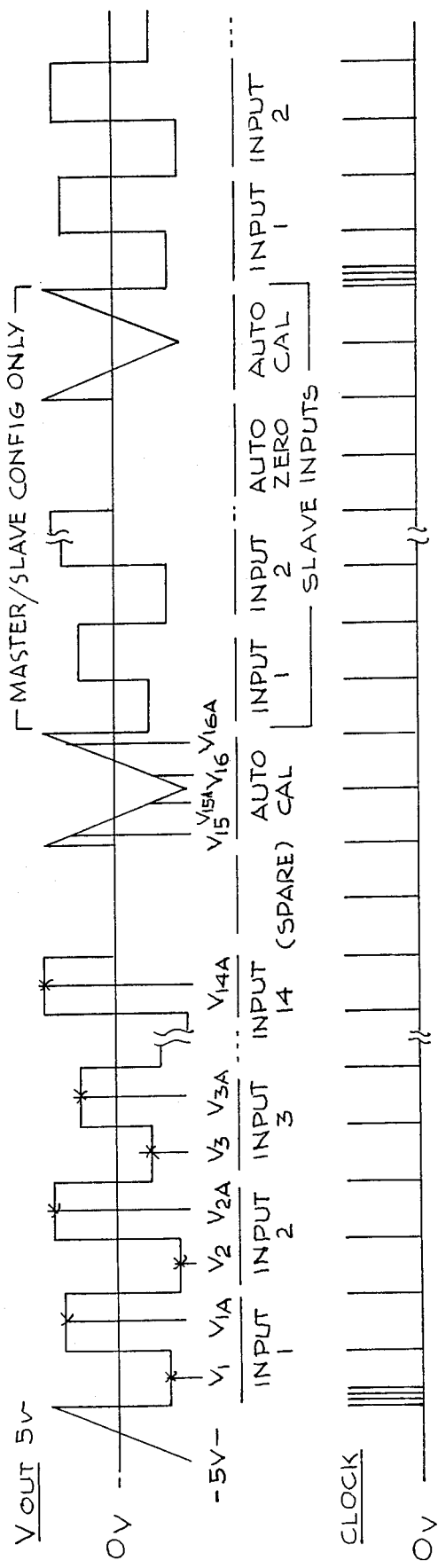
FIG. 6 shows waveform and timing sequences applicable in the processing of fuel quantity data in the system of the invention.

The data stream output from the transmission line driver 56 of a master/slave combination (FIG. 3A) incorporates 14 pulses of data, a signal for automatic calibration (auto-cal), 14 more pulses of data, and a final auto-cal signal. When a single 14 input MJP is utilized, only the first 14 pulses of data, an auto-zero voltage and an auto-cal signal are provided. The data stream waveform is represented in FIG. 6, described hereinbelow.

Figure 4:
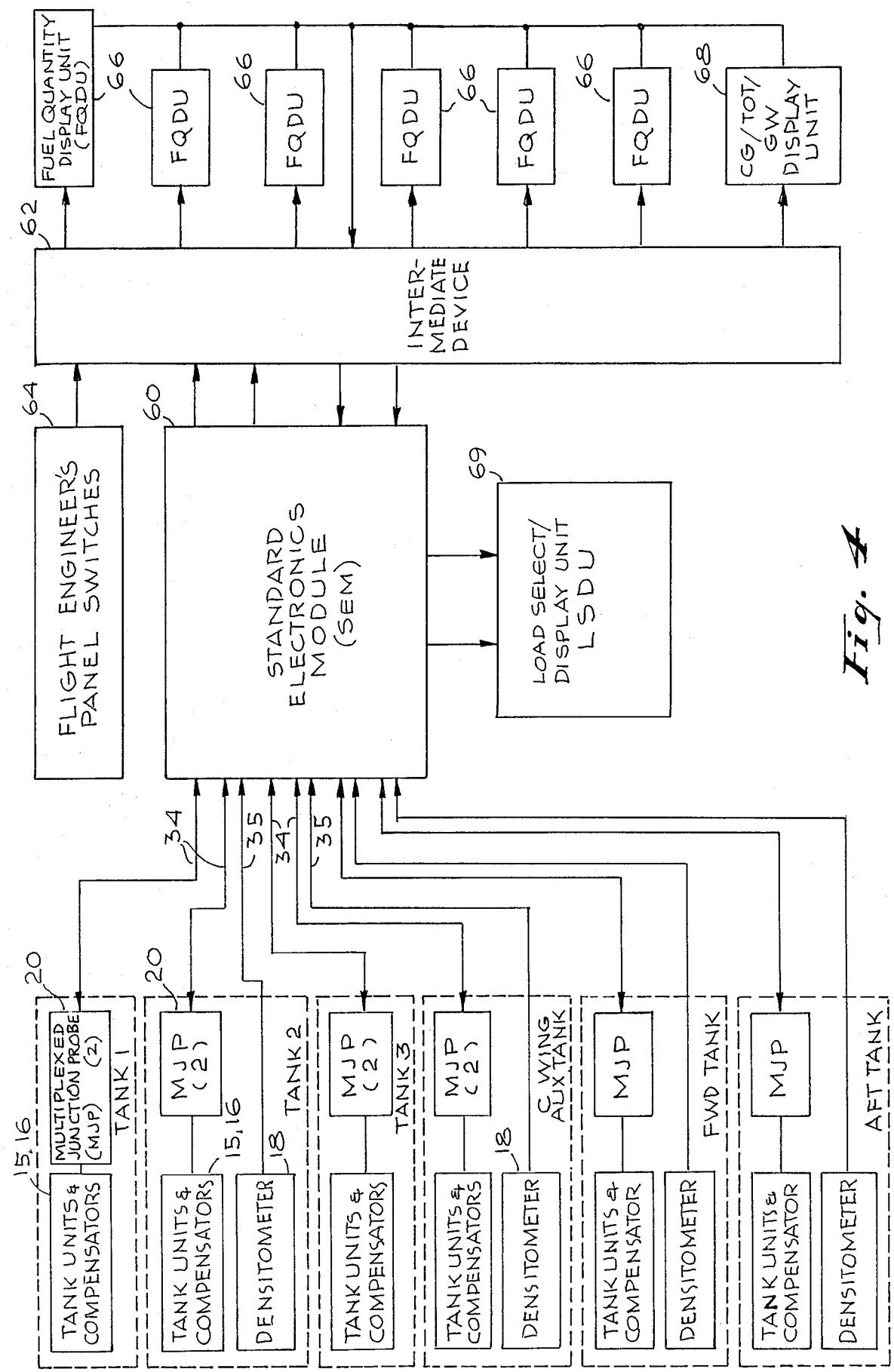
FIG. 4 is a block diagram illustrating one particular arrangement of the multiplexed junction probe fuel gaging system of the present invention.

FIG. 4 is a block diagram representing the overall system of the invention. This is shown comprising a plurality of multiplex junction probes (MJP) 20 associated with various tank units and compensators 15, 16 in the various fuel tanks of an aircraft. In the system shown in FIG. 4, the fuel tanks comprise Nos. 1, 2 and 3, a central wing auxiliary tank, a forward tank and an aft tank. Pairs of MJPs 20, interconnected as in FIG. 3A, are indicated in master/slave combinations in each of tanks 1, 2, 3 and the center wing auxiliary tank. Densitometers 18 are provided in all tanks except tanks 1 and 3. Since tanks 1, 2 and 3 are customarily used and refueled in common, a single densitometer is considered adequate for the fuel in these three tanks. Connections between the MJPs 20 and the Standard Electronics Module (SEM) 60 are provided via leads 34. Leads 35 connect the densitometers 18 to the SEM 60. Such densitometers are described in our aforementioned U.S. Pat. No. 4,420,976; typical units may be obtained commercially as the Type 7824 Avionic Liquid Densitometer from Solartron Electronic Group Ltd. of Farnborough, England. An intermediate device (ID) 62 serves as an interface between the SEM 60, the flight engineer's panel switches 64 and the various Fuel Quantity Display Units (FQDUs) 66 and CG display 68 which are located on the flight engineer's display panel in the cockpit. Also shown as a block 69 in FIG. 4 is the Load Select/Display Unit (LSDU) which receives input signals from the Standard Electronic Module 60. Further details of the LSDU are described hereinbelow in connection with FIGS. 12 and 13.

Figure 5:
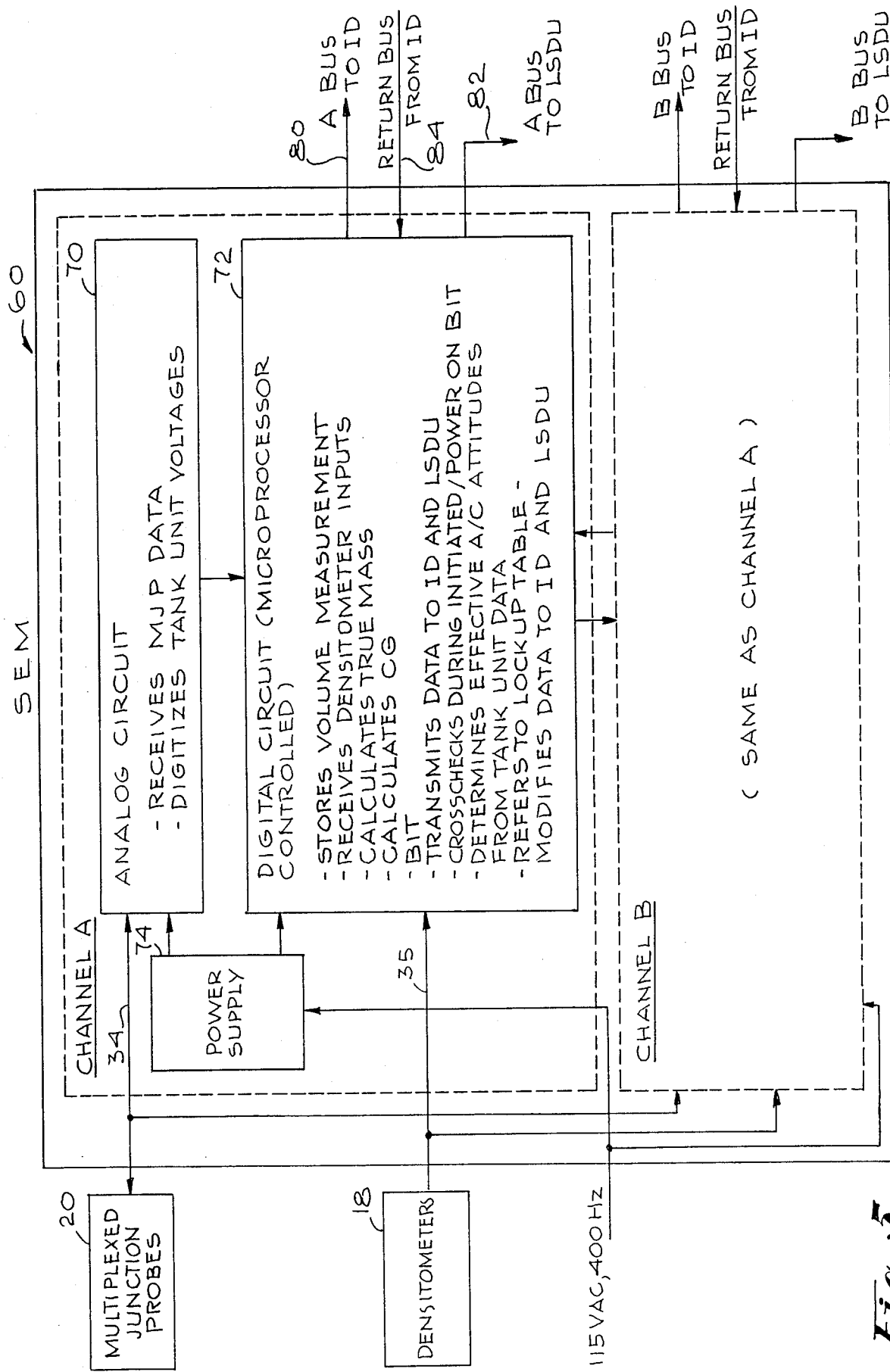
FIG. 5 is a block diagram of the Standardized Electronic Module (SEM) of the system of FIG. 4.

FIG. 5 is a block diagram illustrating the components making up the SEM 60. As indicated, the SEM 60 comprises two channels A and B, which are identical in component and circuit makeup, thereby developing full circuit redundancy for the SEM 60. Each channel (Channel A is shown in detail) comprises an analog circuit 70 which receives the data streams from the respective MJPs 20 via shielded twisted pair leads 34 and samples these analog signals to develop digitized tank unit voltages for application to an associated microprocessor-controlled digital circuit 72. The densitometers 18 are connected to the digital circuit 72 via leads 35. Each channel also contains a power supply 74 which is fed by aircraft main power (115 volts AC at 400 Hz) and supplies appropriate voltages for the analog circuit 70 and digital circuit 72. Each channel has two bus outputs, A bus outputs 80 to the intermediate device 62 and 82 to the LSDU 69, for channel A, and a return bus 84 carrying wrap around signals from the intermediate device.

The digital circuit 72 includes read only memory (ROM) for program storage and random access memory (RAM) for storing the digitized volume measurements which are derived from the tank unit voltages by the analog circuit 70 and the information relating to the densitometer inputs. The digital circuit 72 performs the calculations of fuel true mass, center of gravity (a function of fuel mass, fuel location and Zero Fuel CG), and CG limits (a function of aircraft gross weight), and transmits corresponding data to the intermediate device and the LSDU for display at the various display units. The digital circuit 72 also controls built-in testing (BIT) throughout the system to detect possible faults and provide corresponding indications at the cockpit display.

FIG. 6 illustrates the sampling of waveforms of the various signals representing fuel quantity and the clock timing pulses which control the timing of the data for digitization. The upper waveform in FIG. 6 represents the received data plus the auto-cal signal which is interposed thereon. The upper waveform in FIG. 6 is sampled at points $V_1$, $V_{1A}$, $V_2$, $V_{2A}$ ... $V_{14A}$, $V_{15}$, $V_{15A}$, $V_{16}$ and $V_{16A}$ as shown on the waveform.

The lower waveform in FIG. 6 represents the series of clock pulses which synchronize the data and which, in response to a clock burst at the beginning of a string of clock pulses, initiate the signal sequence.

The signals from an MJP 20, corresponding to the upper waveform in FIG. 6, are applied to the analog circuit 70 in the SEM 60 and are digitized by sampling at the points indicated in FIG. 6 with the sample signals being fed to the digital circuit 72. The circuit 72 processes the digitized samples in accordance with a selected algorithm. This algorithm uses data derived from input 1 up to input 14 (as required) representing the tank unit capacitances and the compensator (reference) capacitances in accordance with the typical data stream from the circuit of FIG. 3. The calculations are performed within the microprocessor controlled digital circuit 72 substantially as follows.

Initially, an autocalibration term, $k_{ac}$, is derived from measurements $V_{15}$, $V_{15A}$, $V_{16}$ and $V_{16A}$ sampled during the auto-cal signal interval as indicated in FIG. 6, according to equation (1).

$$k_{ac} = \frac{V_{15} - V_{15A} + V_{16A} - V_{16}}{2} \cdot k_2 \tag{1}$$

where $k_2$ is a proportionality constant which is stored in the microprocessor memory. This value $k_{ac}$ is used to remove any initial errors or drift in the analog portion of the measuring equipment, such as might result from temperature change, component aging, etc. and to neutralize the effects of such by automatically recalibrating the measuring equipment.

Next a term $V_T$ is calculated according to equation (2), to remove DC offset in the tank signal measurements (illustrated here for 13 tank units), and effect an electronic summation of the tank unit signals.

$$\begin{aligned} V_T = \; & V_{1A} + V_{2A} + V_{3A} + \ldots V_{13A} \\ & -V_1 - V_2 - V_3 - \ldots V_{13} \end{aligned} \tag{2}$$

where the $V_{nA}$ and $V_n$ terms are sampled voltages, digitized at the corresponding points shown in FIG. 6. These are representative of the capacitance values for the individual tank units 15.

Similarly, $V_R$ is calculated according to Equation (3), to remove any DC offset in the compensator measurements (illustrated for a single compensator/reference unit 16).

$$V_R = V_{14A} - V_{14} \tag{3}$$

where $V_{14}$, $V_{14A}$ are sampled voltages digitized at the points shown in FIG. 6.

Next, $V_T$ and $V_R$, as developed from equations (2) and (3), are multiplied by the calibration coefficient $k_{ac}$ (equation 1) to establish the tank units capacitance $C_T$ and the reference capacitance $C_R$.

$$C_T = V_T \cdot k_{ac} \tag{4}$$

$$C_R = V_R \cdot k_{ac} \tag{5}$$

Because the system uses profiled tank units, a factor x, defined as a normalized fuel volume ($0 \leq x \leq 1$), is related to the tank units capacitance $C_T$ and reference capacitance $C_R$, respectively, by the following equations (6) and (7):

$$C_T = C_A + C_E(K-1)x \tag{6}$$

$$C_R = C_{RA} + C_{RE}(K-1) \tag{7}$$

where $C_A$, $C_E$, $C_{RA}$, and $C_{RE}$ are constants which are stored in the microprocessor memory and are defined as follows:

$C_A$ = sum of all tank unit air capacitances;
$C_{RE}$ = effective capacitance of the reference unit;
$C_{RA}$ = reference unit air capacitances;
$C_E$ = sum of the effective capacitances of the tank units; and
K = Dielectric constant of the fuel.

By combining equations (6) and (7), x can be expressed as:

$$x = \frac{(C_T - C_A) C_{RE}}{(C_R - C_{RA}) C_E} \tag{8}$$

The normalized fuel volume x is then used to determined fuel mass.

$$M = x \cdot \text{Vol.} \cdot d \tag{9}$$

where:
M = fuel mass;
Vol. = total tank volume
d = fuel density, as determined from the densitometer 18.

The various tank elements in the multiplex junction probe system are designed such that the error in the term M which is contributed by any error in measuring d in the typical tank is less than 0.1% of the full tank fuel mass. This is an extremely accurate measurement of fuel mass and represents an order-of-magnitude improvement over any known existing fuel gaging system.

MJP tank data, referenced $V_1$ through $V_{13}$, is used by the SEM to determine the fuel surface plane in each tank at the intersection of at least three adjacent tank units. The effective aircraft attitude is then determined from the relationship of the fuel plane to the wing reference plane. This approach will include the fuel acceleration effects for proper correction of fuel gage readout. This effective attitude correction is then applied by the SEM to particular lookup tables which are stored in its non-volatile memory to the above-calculated fuel mass M, equation (9), to derive an attitude corrected fuel mass and achieve greater accuracy in fuel readout.

The SEM output data 80, 82 has each transmitted data bit sent in FSK PDM (frequency shift keyed, pulse duration modulation) format in accordance with the following parameters. The data is updated by the SEM approximately every 2.0 seconds. Thus, one 2-second data stream comprises a first transmission, followed after 250 milliseconds by a second transmission consisting of 104 bits. Transmission No. 1 consists of eight data words, each consisting of four BCD (binary coded decimal) characters. The eight data words are in the following order: Sync No. 1, total fuel (leading zeros blanked), Tank 1, Tank 2, Tank 3, Tank 4, Tank 5, Tank 6, and total fuel (including leading zeros for computing gross weight). In this embodiment, Tanks 4, 5 and 6 correspond to the center wing auxiliary, forward and aft tanks, respectively. The Sync No. 1 word is transmitted as 000000000011. Each tank word and the total fuel data words are transmitted in the order from the least significant bit of the least significant digit through the most significant bit of the most significant digit. Each of the data words for total fuel and Tanks 1 through 6 incorporates leading zero blanking, which is accomplished by transmitting the character Hex F (1111) for all leading zeros.

In Transmission No. 2, a Sync No. 2 word, transmitted as 00001011, is followed by six data words for the six individual tanks. The Sync No. 2 word is the only 8-bit word. The tank words are each 16 bits (four BCD characters). No leading zero blanking is employed in transmission No. 2.

The entire data stream, i.e. both transmissions Nos. 1 and 2, is directed to both the Intermediate Device and the LSDU. However, the Intermediate Device utilizes only transmission No. 1, which is identified by the sync word. The LSDU uses transmission No. 1 for providing a readout of fuel quantity and transmission No. 2 for controlling the preselect, automatic shut-off system. Transmission No. 1 is generated by the SEM microprocessor from measurement data. The SEM microprocessor develops transmission No. 2 from transmission No. 1 before sending out the two transmissions. Each tank data group of transmission No. 2 is offset by a predetermined amount (e.g., +50 Kgs. or +100 lbs.) from the corresponding data group of transmission No. 1 in order to compensate for the response time of the valves in the automatic shut-off system. No leading zero blanking occurs during transmission No. 2. Blanking will occur for all four characters of a faulty tank data word of transmission No. 1.

All data is transmitted as FSK encoded signals. A logic 1 bit consists of a mark for 600 microseconds followed by a space for 200 microseconds. A logic zero is represented by a mark od 200 microseconds followed by a space for 600 microseconds. In each instance, the bit time is 800 microseconds. Mark time is transmitted at 64 Khz, while space time is transmitted at 48 Khz. The information is transmitted as data words comprising four binary coded decimal (BCD) characters. These characters correspond to the following chart, the bits being shown in the order from the least significant bit to the most significant bit, proceeding from left to right.

TABLE I

| BCD 1: | 1000 |
|---|---|
| BCD 2: | 0100 |
| BCD 3: | 1100 |
| BCD 4: | 0010 |
| BCD 5: | 1010 |
| BCD 6: | 0110 |
| BCD 7: | 1110 |
| BCD 8: | 0001 |
| BCD 9: | 1001 |
| BCD 0: | 0000 |
| Hex F: | 1111 |

Hex F is used to signify a blank; thus where leading zero blanking is indicated, Hex F is transmitted for each leading zero.

A number of advantages derive from the use of this FSK PDM format. By using frequency shift keying (FSK), one avoids the sudden transitions encountered when transmitting pulses. Thus, electromagnetic interference filters can be used to minimize electromagnetic interference and the signals can be transmitted in a balanced configuration through transformer coupling. The balanced signals are sent over twisted wire pairs, each pair having a surrounding electrostatic shield braid. This braid is preferably grounded at multiple points to minimize electromagnetic interference. The multiple point grounding is made feasible by use of the balanced signal transmission over the twisted pair. FSK allows use of AC transformer coupled signals (data inputs and outputs) which in turn allows for multiple grounding of the shields for lightning protection. Furthermore, since pulse duration modulation (PDM) is employed, no synchronizing clock is required and interwiring is thereby simplified.

Full duplication of components in the duplicate channels A and B achieves complete redundancy in the SEM 60. This redundancy allows for the system to be restored to normal operation after any single failure in the SEM by switching to the redundant (back-up) channel. The values of true mass, CG and CG limits, calculated in the digital circuit 72 as described above, are transmitted to the Intermediate Device and to the LSDU. Correct transmission to the Intermediate Device, for display in the cockpit, is verified by the use of wrap around on return bus 84 from the Intermediate Device. All data from the SEM 60 is transmitted using FSK PDM format, and the return bus 84 contains the wrap around transmission also in FSK PDM format for BIT verification testing, and also contains additional data from the cockpit, such as zero fuel weight and zero fuel CG.

Within each channel of the SEM 60, the analog circuits 70 and digital circuit 72 are powered by a corresponding power supply section 74. The power supply in each channel is activated by a Channel Select Switch which is located on the flight engineer's panel. The unselected channel is normally not powered and serves as a back-up channel. As part of its Built-In Test capability, the SEM 60 has a Power-Up test which temporarily powers the redundant channel for cross-checking purposes upon application of power.

Figure 7:
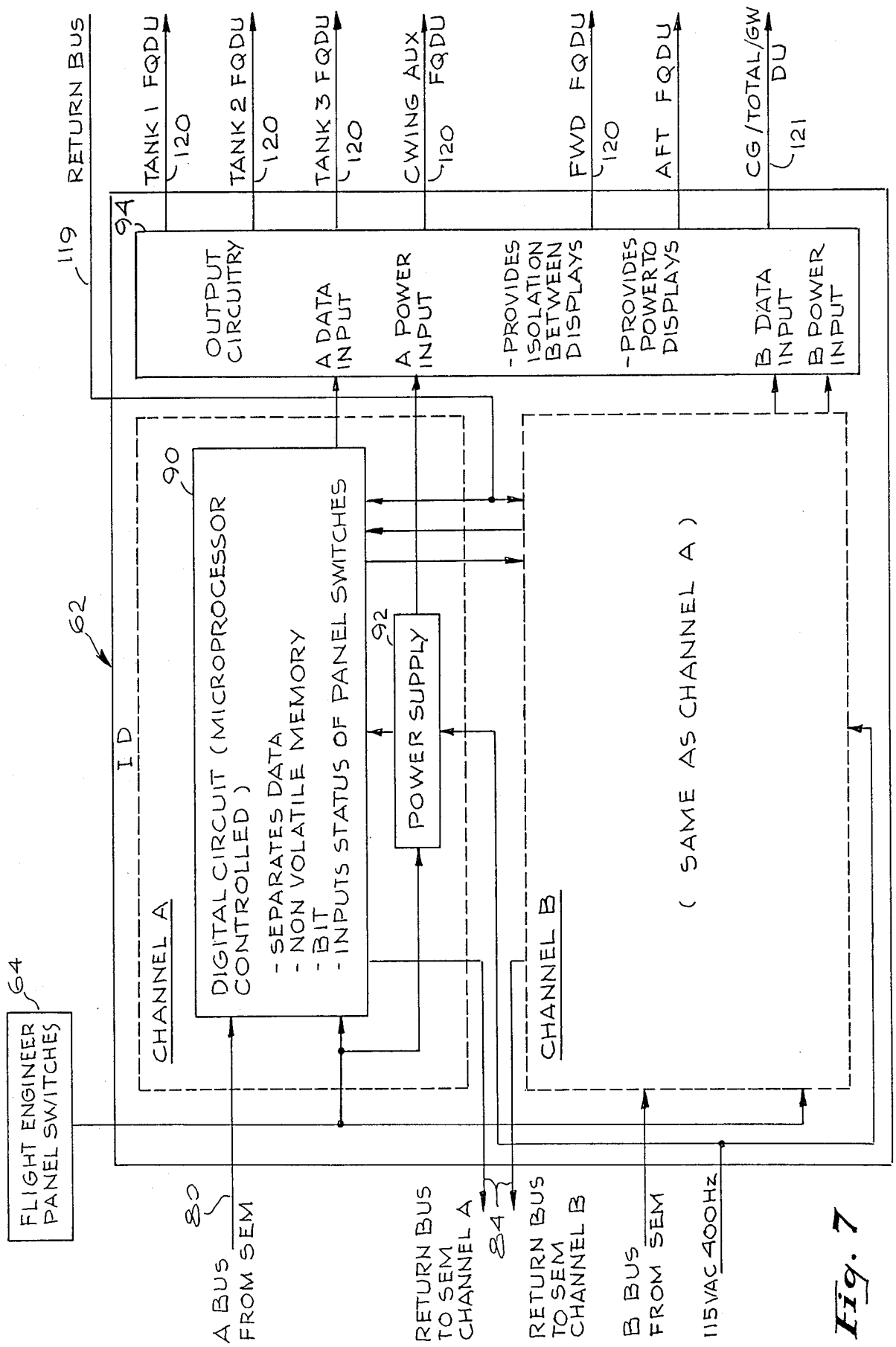
FIG. 7 is a block diagram of the Intermediate Device of the system of FIG. 4.

Details of the Intermediate Device 62 are shown in the block diagram of FIG. 7. Like the SEM 60, the Intermediate Device 62 also comprises channels A and B, which are selectable by flight engineer panel switches 64. Channel A of the Intermediate Device 62 is shown comprising a microprocessor controlled digital circuit 90 and power supply 92 (channel B is identical to channel A). The microprocessor controlled digital circuit 90 receives data over the corresponding A bus 80 from the SEM 60 (FIG. 5) and returns the same signals to the SEM over its A return bus 84 for verification (corresponding to the "wrap around" procedure described above), together with any additional signals representing information input from the flight engineer's panel. The digital circuit 90 includes circuitry for separating received data and for routing it to the appropriate fuel quantity display units (FQDU) in the cockpit in PDM format via fault protected line drivers in the output circuitry 94. The power supply 92 supplies regulated power to the circuit elements in the ID 62 and also provides power to the cockpit FQDUs and CG/GW/Total Fuel displays via the output circuitry 94. Non-volatile memory in the circuit 90 retains intermittent faults which may be detected by any test until cleared by a BIT reset switch on the panel 64.

Both the SEM 60 and ID 62 include extensive BIT to confirm correct system functioning and to provide fault isolation to a Line Replaceable Unit (LRU). These BIT tests include a Power On cross-channel check, operator initiated BIT, and continuous automatic BIT.

During the Power On test, both channels of the SEM and ID are powered. The SEM performs automatic cross-channel tests which cause the SEM to transmit first from the unselected channel and then from the selected channel. During these transmissions, the ID 62 confirms the presence of transmissions from the SEM 60, performs a cross-channel check on itself, and verifies data transmission to the cockpit display units. When an error is detected, a BIT flag is written into non-volatile RAM to indicate which unit is faulted.

SEM transmission on each channel input is checked to confirm that data is in the expected format and is arriving at the correct intervals. Failure of this test sets a BIT flag for the affected channel, SEM A or SEM B. Cross checking tests are performed within the ID as follows. Both channels A and B are powered upon activation of initiated BIT. The SEM inputs to the ID 62 are disconnected and both channels of the ID are connected to a BIT generator. The selected channel processes the test input, outputs the results to the display units 66, 68 and to the unselected channel and then checks the output of the unselected channel. Similarly, the unselected channel performs a cross check on the selected channel by comparing the results of the unselected channel with those of the selected channel (using the same test input). In the event of a detected failure, the BIT flag is set in non-volatile memory. The outputs of each display driver in display units 66, 68 are compared with the data transmitted. Errors are recorded as ID BIT flags designating the affected channel. Wrap around data from each display unit 66, 68 is read and compared with the transmitted data. Differences result in the setting of a display BIT flag for the affected unit. During the Power On test, all BIT annunciators are activated. When the test is completed, all BIT annunciators turn off except for those which had a BIT flag set during the test.

Initiated BIT is started from the cockpit where the operator presses cockpit-mounted BIT initiate switches to isolate a fault to a line replaceable unit. Activating the system test switch starts two tests, the ID test followed by SEM test, to fault isolate a failure to the ID or the SEM. Upon activation of initiated BIT, power is applied to the unselected channel in the SEM and ID.

System test is performed on both channels, after which power to the backup channel is removed. A fault detected in the backup channel is stored in memory in the selected channel and displayed on the appropriate fault annunciator 104 or 172. Thus system test checks both channels of the SEM and the ID. During ID test, the SEM signal is electrically disconnected from the ID, and a BITE code generator injects a BIT code into each channel of the ID. The selected ID channel then distributes the data to the display units 66, 68 and wraps around all outputs for verification. Having first verified that all display units pass display test, any incorrect results now detected isolate the fault to the ID. The unselected channel in the ID is cross checked to the selected channel to verify proper operation. After a three second interval for time out of the ID test, the ID reconnects to the SEM and the SEM test is initiated automatically.

The ID continuously monitors SEM transmissions in automatic BIT to assure they are arriving at reasonable intervals. Failures are recorded as SEM A or SEM B BIT flags. Wrap around PDM data from the display units is routed to the return bus 119 and compared in the ID with the data that was transmitted. Errors are recorded as display BIT flags for the affected unit.

Figure 8:
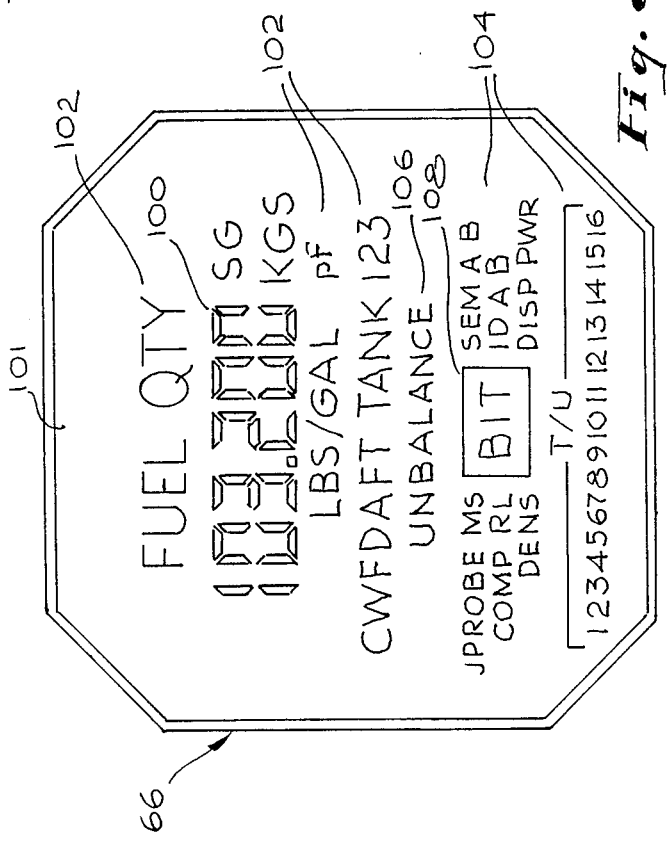
FIG. 8 is a diagram illustrating the face of one of the fuel quantity displays employed in the system of FIG. 4.
Figure 9:
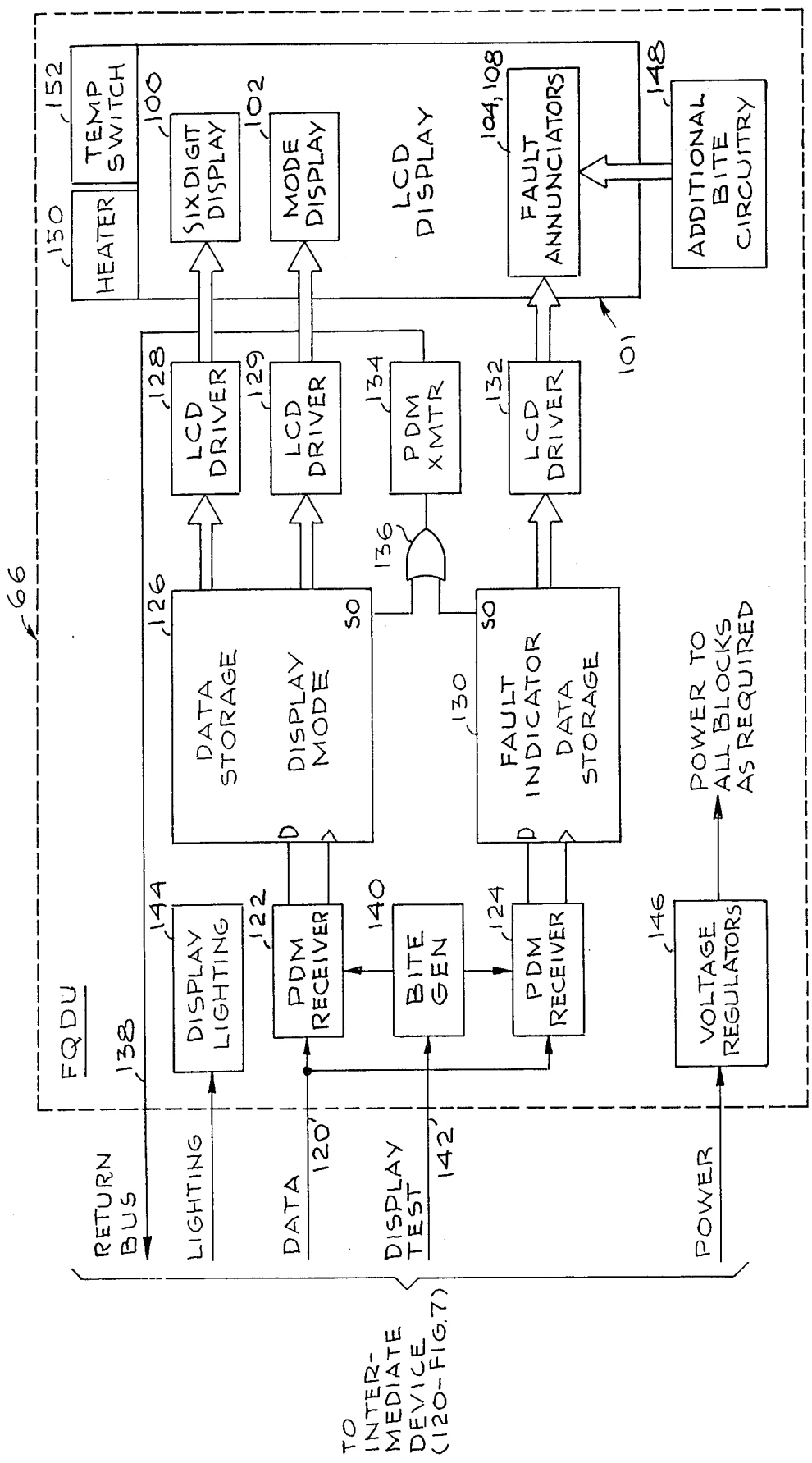
FIG. 9 is a schematic block diagram of the circuitry of the fuel quantity display unit of FIG. 8.

One of the fuel quantity display units 66 is shown in FIG. 8 and a block diagram representing the circuitry of that unit is shown in FIG. 9. On the flight engineer's panel in the cockpit are mounted six identical fuel quantity display units 66, such as the unit represented in FIG. 8, which are individually externally programmable for usage (tanks 1, 2 or 3, center wing auxiliary, forward or aft). These display units show the mass or density of the fuel in the indicated tank. (The density display is selected by momentarily depressing a spring return switch on the panel 64.)

Referring to FIG. 8, the front face of the display unit 66 is provided with liquid crystal display (LCD) element 101 in a six digit display 100 and other displays referred to as mode displays 102, showing which tank is being indicated and what measurement is being shown, and fault annunciators 104. For example, when the digits 100 are driven to indicate fuel quantity, the legend "LBS" or "KGS" is illuminated, together with the term "FUEL QTY". Alternatively, if the LCD digits 100 are providing a reading of fuel density, the legends "FUEL" and "LBS/GAL" or "SG" are illuminated. Also, the particular tank designation ("1", "2", "3", "CW", "FD", or "AFT") is illuminated. During operation of the Built-In Test sequence, the "BIT" legend is illuminated and, should any fault be detected, it is indicated on the fuel quantity display unit 66 by illuminating one of the legends 104 designating the particular unit experiencing the detected fault (Junction Probe, Master or Slave; compensator, left or right; densitometer; SEM A or B; Intermediate Device, A, B or Common; Display; or Power to Display). Thus, the fuel quantity display unit 66 has the capability of indicating a detected fault in any one of up to 16 tank units, either the master or slave junction probe, SEM channels A and B, Intermediate Device channels A and B, the right or left compensator, the densitometer, and the display itself. there is also an "UNBALANCE" legend 106 which is illuminated to indicate the detection of lateral unbalance of fuel between tanks 1 and 3. The "pF" designation of the group 102 is illuminated when the individual tank unit/compensator capacitance input values are displayed on the FQDUs. This can display capacitance values simulated from ground support test equipment so that a maintenance operator may compare the actual capacitance value, in picofarads, with a specifications chart value, or can also display the actual aircraft tank unit/compensator capacitance values.

As shown in the functional block diagram of FIG. 9, the fuel quantity display unit 66 has a single cable 120 which carries the data input from the Intermediate Device 62 to the individual display unit 66. This is supplied to a pair of PDM receivers 122, 124. The PDM receiver 122 provides a pair of outputs to a block 126 containing shift registers for temporary storage, one for display mode indication and the other for data storage. These in turn drive a pair of LCD drivers 128, 129. The LCD driver 128 activates the six digit display 100, shown in FIG. 8. The LCD driver 129 activates the usage display 102 of FIG. 8.

Similarly, the PDM receiver 124 provides a pair of outputs to a block 130 providing shift register storage for fault indication data. The block 130 supplies signals to an LCD driver 132 which is coupled to the fault annunciator section 104 of the display. A PDM transmitter 134 receives shifted data signals from the blocks 126, 130 via an OR gate 136 and sends signals back to the Intermediate Device via a return bus 138 for verification in the wrap around function. A BITE generator 140 is coupled to the PDM receivers 122, 124 in order to exercise the display unit 66 upon receipt of a Display Test input on the line 142. Display lighting 144 and voltage regulators 146, the latter providing the power for all blocks within the display unit 66 as required, receive external inputs from the Intermediate Device. In addition to the BITE generator 140, the unit contains additional BITE circuitry 148 for detecting display faults and for driving the fault annunciators 104. A heater 150 and temperature switch 152 are associated with the LCD display to provide better response times at low ambient display temperatures. The display used in the fuel quantity display unit 66 is a liquid crystal display of the phase-change dichroic type. Markings, annunciators, and characters are white on a black background.

The provision of the two PDM receivers 122, 124 and shift registers 126, 130 develops redundancy for the display of detected faults. The second path through the fault indicator shift register 130 allows a failure in the display usage shift register path 126 to be displayed as a display failure.

The BIT display is in the form of black letters on a field of white, with black and white "barber pole" markings, and is visible when illuminated to indicate a signal malfunction. The particular system malfunction location in the group of markings 104 is displayed along with the BIT display 108 for ease of fault identification.

A Power On test is performed by the system to determine if both channels are functioning properly when power is first applied. Power On test utilizes fixed simulated inputs to the system to verify proper operation. Both channels A and B of the SEM, ID, and LSDU are temporarily powered and cross-checked. Automatic BIT, described hereinbelow, is also performed. If everything is functioning within tolerance, Power On test activates all segments on the display for approximately 15 seconds. This allows the flight engineer to confirm that the system is performing properly and that all segments in the displays are functional. The unselected channel is unpowered at the conclusion of Power On test.

Automatic BIT of the FQDU 66 is performed continuously by wrap around to the ID as well as through the additional BITE circuitry 148. Data that is received from the Intermediate Device over line 120 is checked for parity in the PDM receivers 122, 124 and is then shifted into the respective shift registers of blocks 126, 130. As new data is shifted in, old data is shifted out and is wrapped around back to the Intermediate Device via the return bus 138 in PDM format for verification. The Intermediate Device verifies that the data received on the return bus is what was sent in the previous data frame.

The fuel quantity display unit 66 also includes additional BITE circuitry 148 for detecting (1) parity errors in the received data, (2) if the power supplies 146 are out of tolerance, and (3) if the Intermediate Device stops sending data. Any one of these conditions causes the circuitry to activate the appropriate BIT annunciator 104, alerting the flight engineer as well as altering the wrap around data to reflect the detected failure. This failure signal is stored in the Intermediate Device and is retransmitted to the display unit 66, just as any other failure. This is done in order to alert the flight engineer to a problem in the event the fault is intermittent and clears itself.

Initiated BIT is begun by the operator depressing a display test switch located on the flight engineer's panel 64. When the display test line 142 is activated, all fuel quantity display units 66 begin display tests. During display tests, the data input over line 120 to the PDM receivers 122, 124 is disconnected and the BITE generator 140 is connected to an input of the display unit. The BITE generator 140 simulates an input to the display unit which activates all display segments. The display unit 66 remains in digit test mode for as long as the display test switch is depressed, up to a maximum of 60 seconds, after which the display automatically reverts to its normal operating mode. This prevents the unit 66 from being locked into a test mode in the event of a switch failure. When the switch is released, the display unit 66 reverts back to normal operation.

Any errors are detected and classified as display unit failures by the automatic BIT.

Figure 10:
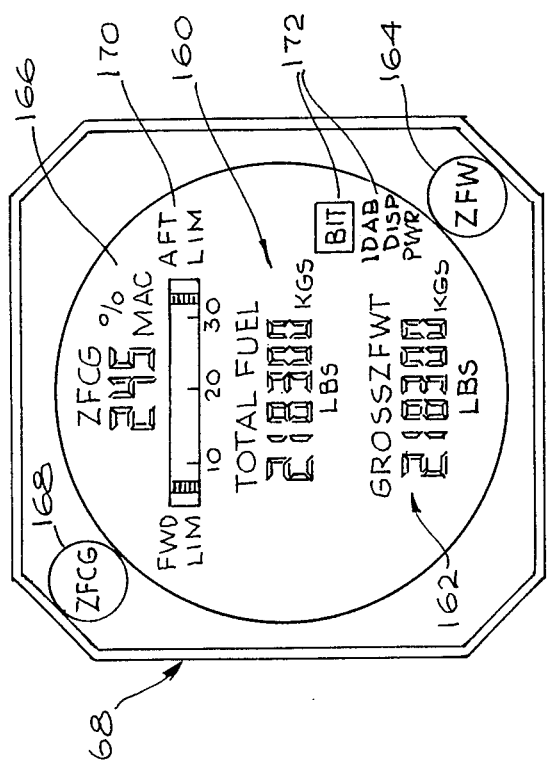
FIG. 10 is a diagram illustrating the face of a fuel quantity/center of gravity display unit utilized in the system of FIG. 4.
Figure 11:
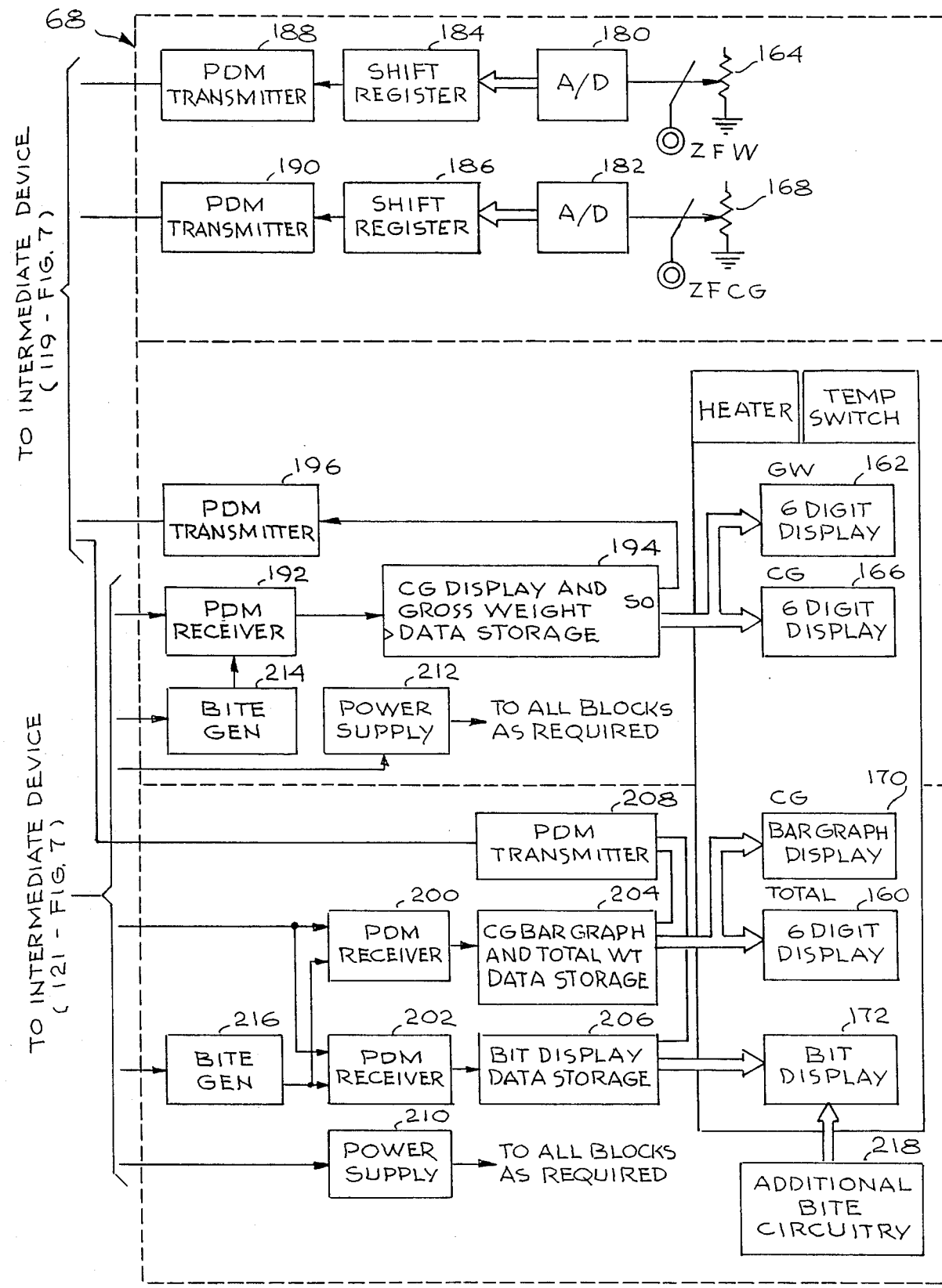
FIG. 11 is a schematic block diagram of circuitry of the fuel quantity/center of gravity display unit of FIG. 10.

The fuel totalizer and CG display unit 68 is shown in FIG. 10 and the circuitry of this unit is represented in the block diagram of FIG. 11. Total fuel, either in pounds or kilograms, is displayed in the LCD display 160. Gross zero fuel weight (ZFW) is indicated in the display 162. The gross ZFW reading can be set by the operator with the potentiometer 164. At the top of the display 68 is the zero fuel center of gravity (ZFCG) reading 166 which is shown as a percentage of MAC (Mean Aerodynamic Chord). This is adjustable by the ZFCG potentiometer 168. Just below that is a bar graph display 170 which provides an analog indication of the actual fore/aft unbalance, between forward and aft limits, as determined from the fuel mass readings from the various tank units. The display unit 68 also includes a BIT display 172 for indicating detected faults.

The circuit for the center of gravity/total fuel display unit 68, as shown in FIG. 11, is similar to that of the fuel quantity display unit 66, shown in FIG. 9, except that there are two data/display sections for the two types of data which are displayed and there is also a section for transmitting data to the system which is originated in the unit 68. Information regarding the gross zero fuel weight of the aircraft (fuel tanks empty) and zero fuel center of gravity is input from the flight engineer's panel by manipulation of the potentiometers 164, 168. Potentiometer voltage is converted to digital signals in the analog-to-digital converters 180, 182, temporarily stored in shift registers 184, 186 and transmitted for storage in the Intermediate Device by PDM transmitters 188, 190. This data is immediately sent back from the Intermediate Device to the PDM receiver 192, from which it is directed to shift registers in a data storage block 194 and applied to the six digit display of gross weight (GW) 162 and the three digit display of ZFCG 166. The stored signals are also transmitted back to the Intermediate Device via PDM transmitter 196 for comparison with the data stored in the Intermediate Device memory and verification.

Data relating to total fuel quantity and CG is directed from the Intermediate Device to a pair of PDM receivers 200, 202 and stored in shift registers in the respective data storage blocks 204, 206. Block 204 stores the data for dynamic center of gravity and total fuel and supplies this data to the center of gravity bar graph display 170 and the total fuel display 160. The block 206 stores the data relating to BIT display and applies this data to the BIT display 172. Both of the blocks 204, 206 also apply the data to a PDM transmitter 208 for retransmission to the Intermediate Device for comparison with the data previously sent therefrom to verify accuracy and detect any faults. Voltage regulator power supplies 210, 212 distribute power to the individual blocks within the display unit 68 from system power supplied via the Intermediate Device. BITE generators 214, 216 operate upon Power-Up to test all of the individual blocks within the display unit 68 in the following manner.

The CG/GW display unit 68 has three forms of BITE—Power On test, automatic BIT and initiated BIT—to provide greater assurance in the accuracy of the displayed values and to help isolate a fault to a particular LRU (Line Replaceable Unit). The Power On test is automatically initiated when power is first applied and verifies that the display unit 68 is functional. The automatic BIT test monitors general circuit condition on a continual basis. Initiated BIT testing (Display Test) is used to fault isolate to an LRU. A fault detected by any of these three tests causes the BIT display 172 and associated fault location annunciators to be activated.

The Power On test is similar to that described for the circuit of FIG. 9. After the initial Power On test as described above, the test activates all segments on the display for approximately 15 seconds, allowing the flight engineer to confirm that all segments in the displays are functional. The system Power-On test continues to the end of its cycle.

Automatic BIT of the display unit 68 is performed continuously by wrap around to the Intermediate Device, as already described. The additional BITE circuitry 218 also monitors various conditions, such as detecting parity errors in received data, out-of-tolerance levels in the power supplies 210, 212 and interruption of data from the Intermediate Device. If any such malfunction is detected, even temporarily, the BIT display 172 and associated annunciator are activated, and the fault detection is sent to the Intermediate Device for storage and retransmission to the display unit 68.

The initiated BIT test is begun by the operator depressing the display test switch located on the flight engineer's panel. Operation in this test mode is identical to that described hereinabove with respect to the circuit of FIG. 9.

By virtue of the multiplexed junction probe providing individual readings from the separate tank units, the provision of dual channel data processing throughout the system, and the extensive test procedures which have been incorporated in the various equipment sections, the system possesses a substantial capability for fault detection and isolation while still providing usable fuel information displays in the presence of existing faults, with protection against disablement of the system from the occurrence of a fault. The provision of full dual-channel redundancy in the data processing modules making up the system permits the system to be operated via an alternative channel when a fault is detected in one channel. Switch-over to the fault-free channel is effected under manual control from the cockpit or the LSDU. All circuitry which is common to more than one fuel tank is redundant. The backup circuitry is normally not powered, except during BIT test in order to reduce power dissipation and circuit aging.

The standardized electronics module (SEM) provides the control for the bulk of the system and applies extensive built-in testing (BIT) for fault isolation to a line replaceable unit (LRU) with a high degree of confidence. The SEM BIT is of three types: Power-On test, initiated BIT and automatic BIT.

When power is first applied, the Power-On test is automatically initiated. Approximately the first minute after power is applied, both channels are powered and are allowed to warm up. During this interval, test inputs are applied to the channel that is not selected by the channel switch, together with a simulated densitometer signal. After approximately one minute, a test fuel quantity reading is computed by the unselected channel, based upon the simulated inputs. Thereafter, the system automatically switches the same simulated test inputs to the other (selected) channel and a test fuel quantity reading is computed by that channel. The SEM then cross checks itself by comparing the test readings calculated by each channel. If they are in agreement (within an allowable tolerance) then both channels are verified to cross check properly. If they disagree by more than a predetermined amount, the channel that is farthest from the nominal test value is considered to be in error, and this failure is annunciated on the cockpit located displays; i.e., the appropriate BIT annunciator is activated and the designated SEM channel is shown as being faulty (see displays 104 and 108 of FIG. 8). After approximately one minute, the Power On test is completed and power to the unselected channel is automatically removed.

Initiated BIT is performed from the cockpit and serves to test the overall system and isolate a detected fault to the particular LRU involved. A first part of this test is the SEM test which is to fault isolate a failure to the SEM. During this test, the tank located components (tank units, compensators and densitometers) are electrically switched out of the system and simulated inputs are substituted therefor as described above. These simulated inputs are selected to develop predetermined numbers on the displays. The SEM then performs the normal measurements and computations. Data is transmitted to the intermediate device and is wrapped around for verification. Any incorrect results indicate that the fault is in the SEM. In addition, during SEM test, power is applied to the unselected channel. A fault detected in the back-up channel is stored in memory in the selected channel and is displayed on the appropriate fault annunciator. Because warm-up time is eliminated, wider tolerance limits are applied in detecting a fault in the unselected channel. Thus, the SEM test checks both channels of the SEM.

The other part of initiated BIT is the C test, which is designed to fault isolate to the tank units or the compensator. C test is identical to the SEM test except that the tank located compensator is used. During C test, the SEM again wraps around for data verification. Any incorrect results indicate that the tank compensator is at fault. While either the SEM test or the C test is in effect, a properly operating system will have all tank displays indicate a fixed value of fuel quantity (for example, 40,000 lbs+/−100 lbs.).

Automatic BIT is under control of the SEM microprocessor and continuously monitors various system functions and supplies warning signals to the operator in the event of a malfunction. The automatic BIT tests are performed once each update cycle in the following manner.

In the compensator test, the tank located compensator is checked to verify that its value is within allowable tolerances which are dictated by fuel characteristics. If the tank units indicate the presence of fuel, the compensator should be at its wet value within a tolerance which takes normal fuel characteristic variations into account. If the tank units indicate the absence of fuel, then the compensator shall not be more than its maximum wet value and not less than its minimum dry value. A detected compensator failure causes the indicator to "self-heal", that is, to substitute a fixed compensator value, and the failure is annunciated on the appropriate display. In this mode, the display continues to function but shows an uncompensated measurement.

The tank unit test checks the tank unit signals for values within predetermined tolerance limits. This test detects open and shorted tank wiring and tank units where out-of-limit conditions result. In addition, open-circuited or shorted tank units or any interconnecting wire that does not cause out-of-limit conditions may be detected by rate-of-change constraints which are placed upon processed tank data. A sudden change in measured signal, as determined by comparison with a running average value for that tank, is construed as a tank fault. In addition, health checking of tank unit signals will pick up the presence of unacceptable concentrations of water or fuel contaminants which would adversely affect the display's accuracy.

The multiplexed junction probe provides a measurement of each individual tank unit and, if a tank unit measurement is found to be less than one-half the dry value of the smallest tank unit for two successive measurement cycles, the tank unit is considered faulty. Data from faulted tank units will not be used in fuel mass measurements, but a predetermined value derived from the the height vs. volume curve for that tank compartment is used in its place. The detection of a tank unit fault activates the BIT annunciator and turns on the BIT display, thus identifying which tank unit is affected. The densitometer is checked in similar fashion; that is, to determine if the data received is within allowable tolerances as dictated by fuel characteristics and refueling procedures. Any detected failure causes an appropriate fault annunciation to be illuminated and a predetermined value to be substituted for the erroneous signal.

The integrity of the Hi-Z signal is examined in order to verify that the wave shape is within acceptable limits. In conjunction with the tests of the tank units and densitometers, the Hi-Z signal test serves as a redundant check on external wiring, as well as on the signal generator circuitry.

The analog signal conversion circuitry in the SEM is periodically checked by applying a pair of reference voltages (a "low test" voltage and a "high test" voltage) to the demultiplexer which precedes the A/D converter. These low and high test reference voltages check the A/D converter for offset and slope errors, respectively. The microprocessor in the SEM verifies that the resulting signals from the test reference voltages are within allowable tolerances. Each DC power supply is also checked in a similar fashion to verify that the power supply voltages are within acceptable tolerances.

The random access memory in the SEM digital circuitry is tested by sequentially loading in segments with a checkerboard pattern of alternate ones and zeros. This test is non-destructive to the memory contents, since one segment is always reserved to save and restore the data for the segment under test. The entire program of the read only memory (ROM) is tested via a checksum and comparison with the stored value.

Hardware watchdog timers are used to control maximum time and minimum time for microprocessor operation. The maximum timer assures that the microprocessor does not get hung up, that is, by failing to execute its program in a predetermined time period. The maximum timer is reset regularly by a specific sequence of outputs which are absent when a microprocessor execution time fault exists. If the maximum timer reset sequence is absence, the fault is detected. A minimum timer is used to prevent erroneous looping of the program by establishing a minimum program completion time.

The wrap around function results from the fact that every output (including data buses) is "wrapped around"; that is, fed back to a microprocessor input where the output is compared with a known value corresponding to what the output should be. Thus, if an output circuit has failed, it is detected.

The series of tests described above results in a configuration that has virtually all of the major functional sections in the system tested by at least two or more independent BIT tests. Corresponding BIT annunciators are activated by failures which are detected by BIT and stored in non-volatile memory in the SEM and ID. The BIT annunciators may be cleared by activation of the BIT CLEAR switch located in the cockpit on the flight engineer's panel. Because of the storage of detected failures (which include possible intermittent failures) in the non-volatile memory, the information about intermittent failures is retained after power is removed, thereby substantially assisting the trouble shooting procedure in system maintenance. Furthermore, fault detection is extremely reliable and high confidence can be placed in the display values. Thus, in addition to the greater accuracy of the fuel quantity readings which is provided by the present system so that lower reserves of fuel are required in order to assure sufficient fuel for a flight, the flight personnel can with confidence operate closer to the required reserves.

Figure 12:
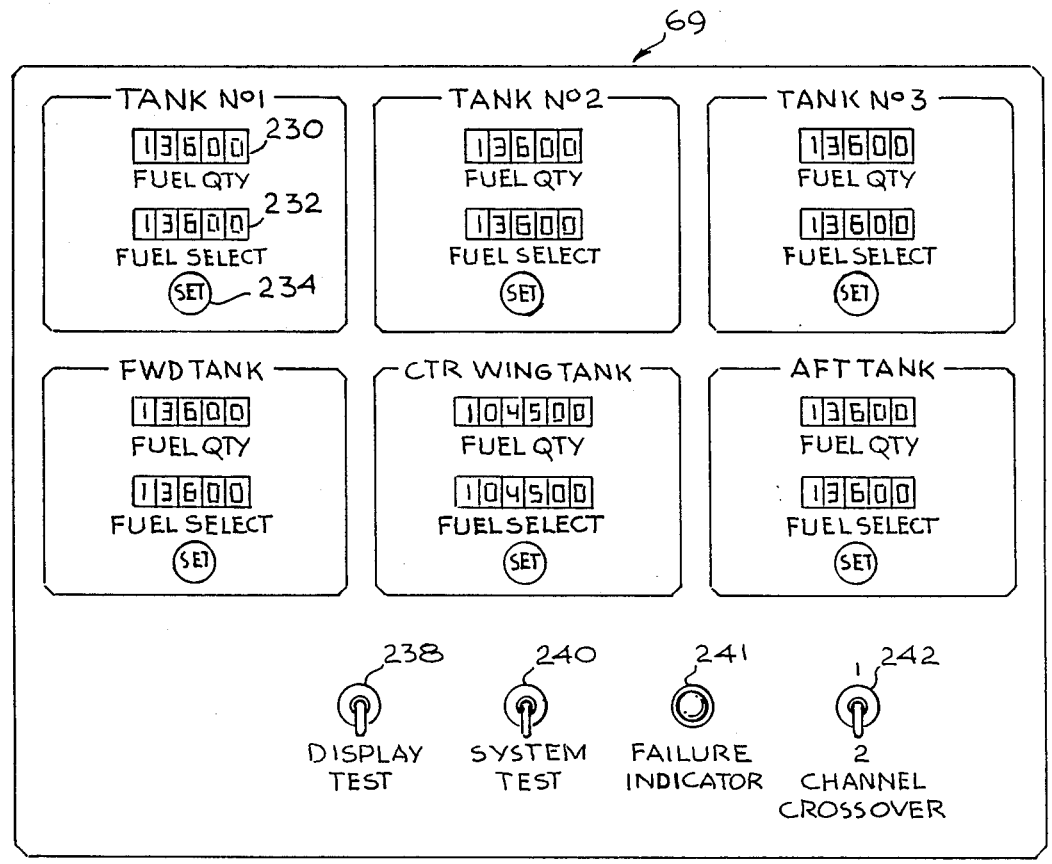
FIG. 12 is a view illustrating the front panel display of the Load Select/Display Unit (LSDU) included in the system of FIG. 4.
Figure 13:
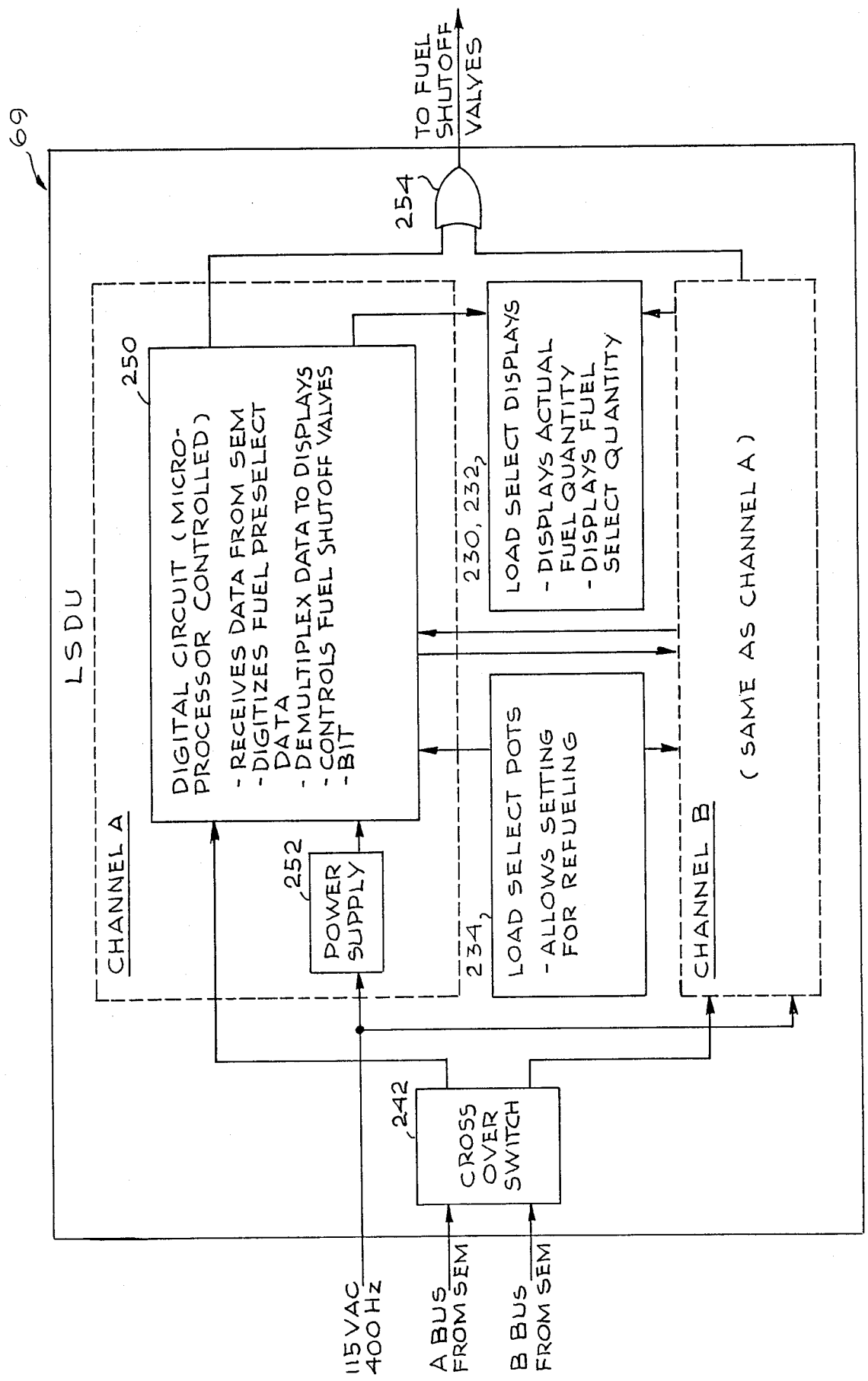
FIG. 13 is a schematic block diagram of the LSDU of FIG. 12.

The load select display unit (LSDU) 69 is depicted in FIG. 12 and its circuitry is represented in the block diagram of FIG. 13. This unit is customarily located at a convenient location on one wing of the aircraft where the indicators are visible to ground personnel in charge of refueling the aircraft. For each tank, there is a fuel quantity display 230 and a fuel select display 232. The value on the fuel select display 232 is adjusted by a set knob 234, and this is effective to determine the amount of fuel which is to be in the corresponding tank after refueling. Circuitry associated with the fuel select display 232 controls associated fuel supply valves (not shown) and closes the associated valve whenever the reading of the fuel quantity display 230 is within a predetermined range of the reading of the fuel select display 232. The LSDU 69 also includes a display test switch 238, a system test switch 240, a failure indicator 241 and a channel cross over switch 242.

Referring to FIG. 13, the LSDU circuitry is shown comprising two identical channels 1 and 2. Each channel comprises a microprocessor controlled digital circuit 250 coupled to receive inputs from the load select potentiometers, controlled by the set knobs 234 (FIG. 12), and provides signals to energize the fuel quantity and fuel select displays 230, 232. The circuit 250 also receives tank data from the SEM, when its corresponding channel is active. It demultiplexes this data and applies the demultiplexed data to the displays 230, 232. It digitizes the analog signals from the load select potentiometers 234, provides the comparison with the received data from the SEM and, at the appropriate point, generates the signal to activate the fuel shut off valves. Each channel also includes a power supply which is driven by aircraft main power (115 v. AC).

The test switches 238, 240 of the LSDU 69 correspond to similar test switches on the flight engineer's panel and enable the refueling personnel to conduct various tests, including LSDU display test and system test, which can be performed by the flight engineer as described hereinabove.

Although there have been described above specific arrangements of a multiplexed junction probe for a fuel gaging system and the overall system itself in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A multiplexed junction probe fuel gaging system for aircraft having at least one fuel tank with multiple fuel sensing units comprising:

a plurality of individual elements mounted wihtin a tank for sensing fuel and providing signals corresponding to fuel measurement;

signal processing apparatus on board the aricraft for converting analog data signals to digital values corresponding to measured fuel quantity;

a junction probe installed in a tank and including circuitry separately coupled to the individual tank mounted elements, the junction probe also being coupled to the signal processing apparatus by a common signal path;

first circuit means included in the junction probe for electrically driving said elements; and second circuit means in the junction probe for individually measuring said plurality of elements in a predetermined sequence and forming a data stream of analog signals corresponding to the sequence of signals from said elements for transmission to the signal processing apparatus over said common signal path, said data stream containing information separately representative of each individual element for processing in said signal processing apparatus to determine the fuel measurement at each individual element which is measured.

2. The system of claim 1 wherein the tank mounted elements comprise a plurality of tank units within a tank for sensing fuel level and a compensating capacitor within the tank for developing signals proportional to fuel density.

3. The system of claim 1 further including a second junction probe installed in a tank with the first-mentioned junction probe in a master/slave combination, the second junction probe including means for electrically driving a separate plurality of tank mounted elements associated with the second junction probe and measuring the associated elements in a predetermined sequence to form a data stream of analog signals corresponding to said measurements for application to the first junction probe;

the first junction probe further including a slave receiver for receiving signals from the second junction probe and incorporating them in the data stream of analog signals developed by the first junction probe for transmission to the signal processing apparatus.

4. The system of claim 1 wherein the signal processing apparatus comprises a plurality of like processing channels of which one may be selected for active operation, each channel being coupled to receive the data stream of sequential analog signals over said common signal path and including circuit means for digitizing the analog signals and storing the resultant digital values.

5. The system of claim 1 wherein the signal processing apparatus includes a standard electronic module coupled to the common signal path, display means for displaying measured fuel quantity, and an intermediate device coupled between the standard electronic module and the display means for receiving output signals from the standard electronic module and processing said signals for application to the display means.

6. The system of claim 5 wherein the standard electronic module and the intermediate device each comprise a pair of identical signal processing channels, one of each pair being selectable as an active operating channel and the other being a back-up channel.

7. The system of claim 6 wherein multiple fuel tanks are provided and including at least one junction probe in a tank and a plurality of associated tank mounted elements in each tank, and further including means coupling the common signal path from the junction probe in each tank to both of the pair of channels in the standard electronic module.

8. The system of claim 7 wherein the tank mounted elements comprise a plurality of tank units and a compensator in each tank and further including a densitometer in at least one of the fuel tanks and means coupling the densitometer of each tank to both of the pair of channels in the standard electronic module.

9. The system of claim 8 further including means in the standard electronic module for calculating true mass of measured fuel from signals indicative of fuel volume in a given tank and signals from the densitometer in that tank.

10. The system of claim 9 further including means in the standard electronic module for calculating center of gravity from separate signals derived from the individual tank mounted elements and from predetermined signals indicative of selected aircraft parameters.

11. The system of claim 10 wherein each channel in the standard electronic module includes bus means for transmitting signals indicating true mass and center of gravity to the intermediate device.

12. The system of claim 11 wherein each channel in the intermediate device includes means for receiving said bus means signals from the standard electronic module and separating the true mass and center of gravity signals for display in corresponding display means.

13. The system of claim 12 further including a plurality of input means at an operator's panel in the aircraft for selectively inputting settable modes to the intermediate device for transmission to the standard electronic module.

14. The system of claim 13 wherein the intermediate device and standard electronic module further include means for storing input means states corresponding to said settable modes and wherein said module includes means for combining the fuel center of gravity measurements with corresponding zero fuel center of gravity signals from the operator's panel to develop a display of aircraft center of gravity corresponding to fuel distribution.

15. The system of claim 14 wherein the display means includes a first display unit having means for displaying aircraft center of gravity as a percentage of mean aerodynamic chord derived from zero fuel center of gravity condition input from the operator's panel and distribution of fuel mass as calculated in the standard electronic module.

16. The system of claim 15 wherein the first display unit also includes an analog bar graph display of percentage of mean aerodynamic chord between forward and aft limits.

17. The system of claim 16 wherein the first display unit also includes a display for indicating total onboard fuel as calculated in the standard electronic module.

18. The system of claim 17 wherein the first display unit also includes separate potentiometers accessible to an operator for manually inputting to the intermediate device signals corresponding to zero fuel center of gravity and zero fuel weight.

19. The system of claim 15 wherein the display means further include a plurality of second display units, one for each tank, for displaying the fuel mass in a corresponding tank as calculated in the standard electronic module.

20. The system of claim 19 wherein all of the tank display units are constructed in a common configuration, each tank display unit being externally programmed to operate with the tank to which it corresponds.

21. The system of claim 19 wherein each tank display unit includes means for displaying fuel mass, fuel specific gravity, and capacitance of individual tank mounted units, as selected by an operator, in accordance with signals from the standard electronic module transmitted via the intermediate device.

22. The system of claim 19 wherein each tank display unit includes annunciator means for indicating the detection of faults and the location of a detected fault in any one of the following parts of the system: junction probe, master or slave; compensator, right or left; densitometer; standard electronic module, A or B channel; intermediate device, A or B channel or common circuitry; tank display unit; power supply voltage display unit; and any one of the tank mounted units in the corresponding fuel tank.

23. The system of claim 19 wherein each tank display unit includes an annunciator for providing a warning of lateral unbalance in the center of gravity due to fuel distribution as calculated in the standard electronic module.

24. The system of claim 19 further including built-in test equipment for testing each of the channels in the standard electronic module, the intermediate device, the load selector display unit and each of the components in the first and second display units upon the application of power to the system and in response to signals developed upon initiation of system test by an operator.

25. The system of claim 24 wherein the built-in test equipment includes means for applying simulated tank mounted element and densitometer signals to each channel of the standard electronic module in turn and comparing the corresponding test readings as calculated in the respective channels for detecting faults in the true mass and center of gravity calculating portions of the standard electronic module.

26. The system of claim 25 wherein the built-in test equipment further includes means for comparing received tank compensator signals with predetermined allowable limits for said signals and providing a fault indication signal at a corresponding tank display unit upon detection of a tank compensator signal outside said allowable limits.

27. The system of claim 26 further including means for substituting a fixed compensator value for the signal from a tank compensator in which a fault is detected so that fuel quantity measurement is not disabled by a detected fault in a tank compensator.

28. The system of claim 24 wherein the built-in test equipment includes means in the standard electronic module for storing a running average of signals from the respective tank mounted elements and comparing the individual signals with said running average to detect an abrupt change in measured signals and provide a corresponding fault display.

29. The system of claim 25 further including means for individually testing the tank units in succession and, upon detection of a faulty tank unit, substituting a predetermined signal value derived from a height vs. volume curve for that tank as the signal to be used in calculating fuel mass.

30. The system of claim 25 wherein the standard electronic module and the intermediate device include non-volatile memory for storing indications of equipment failure detected during testing without loss of said stored failure indications upon removal of system power.

31. The system of claim 19 wherein each of the first and second display units includes means for storing fuel quantity data and fault indication data and means coupled to the storing means for activating corresponding displays of the display unit.

32. The system of claim 31 further including return bus means extending between each display unit and the intermediate device for transmitting sequentially stored data back to the intermediate device for comparison with the data previously sent by the intermediate device in order to detect discrepancies between the compared data.

33. The system of claim 16 wherein said forward and aft limits are variable in accordance with aircraft gross weight data input from the operator's panel, as determined by the standard electronic module.

34. The system of claim 9 further including a load select display unit for receiving signals from the standard electronic module and providing a display of fuel quantity at a refueling panel.

35. The system of claim 34 wherein the load select display unit includes a plurality of display modules, one for each tank; each module including a fuel quantity display and a settable fuel select display for controlling the amount of fuel to be added to the corresponding tank.

36. The system of claim 35 wherein the load select display unit includes a pair of like data processing channels and a cross over switch for selecting the channel to be activated.

37. The system of claim 12 further including redundant return bus means between the standard electronic module and the intermediate device for returning signals from the intermediate device corresponding to those sent to the intermediate device from the standard electronic module and means in the standard electronic module for comparing the returned signals with corresponding signals stored therein to detect any discrepancy between the two sets of signals and provide a fault detection signal when a discrepancy is detected.

38. The system of claim 37 further including return bus means extending between the display means and the intermediate device and means within the intermediate device for comparing the returned signals with corresponding signals stored therein to detect any discrepancy between the two sets of signals and provide a fault detection signal when a discrepancy is detected.

39. The system of claim 5 wherein the first circuit means in the junction probe include timing and control circuitry responsive to synchronizing signals from the standard electronic module for developing the data stream of analog signals in a predetermined sequence.

40. The system of claim 39 wherein said timing and control circuitry includes means for injecting calibration signals in the sequence of tank mounted element signals for use in detecting drift in analog signal reference level due to variations in circuit parameters with use.

41. The system of claim 40 wherein the standard electronic module includes means for monitoring the calibration signals and automatically adjusting analog signal reference levels to compensate for detected drift thereof.

42. The system of claim 26 wherein the standard electronic module includes clock synchronizing means for providing said synchronizing signals to the timing and control circuitry in the junction probe.

43. A multiplexed junction probe for use in the system of claim 1, the probe being adapted for installation in an aircraft fuel tank and comprising:
circuitry for separately coupling to each individual tank mounted element of said plurality and for coupling to the common signal paths leading to the signal processing apparatus;
first circuit means for electrically driving the tank mounted elements sequentially; and
second circuit means for individually measuring said plurality of elements in a predetermined sequence and forming a data stream of analog signals corresponding to the sequence of signals from said elements for transmission to the signal processing apparatus over said common signal path, said data stream containing information separately representative of each individual element for processing in said signal processing apparatus to determine the fuel measurement at each individual element which is measured.

44. The probe of claim 43 further including a second multiplexed junction probe intercoupled with the first-mentioned junction probe in a master/slave combination, the second junction probe including means for electrically driving a separate plurality of tank mounted elements associated with the second junction probe and measuring said associated elements individually in a predetermined sequence to form a data stream of analog signals corresponding to said measurements for application to the first junction probe;

the first junction probe further including a slave receiver for receiving signals from the second junction probe and interspersing them in the data stream of analog signals developed by the first junction probe for transmission to the signal processing apparatus.

45. The probe of claim 43 wherein the first circuit means include timing and control circuitry responsive to synchronizing signals from the signal processing apparatus for developing the data stream of analog signals in a predetermined sequence and time separation.

46. The probe of claim 45 wherein said timing and control circuitry includes means for injecting calibration signals in the sequence of tank mounted element signals for use in detecting drift in analog signal reference level due to variations in circuit parameters with use.

47. A junction probe for installation in the fuel tank of an aircraft to develop signals for measurement of fuel quantity in the tank comprising:

means for individually coupling to a plurality of fuel sensing elements mounted within the tank;

means for electrically driving the tank mounted elements over a common connection to one side of each of said elements; and a multiplexer coupled to individual leads from the other side of each of said elements, said multiplexer being adapted to measure individually the signal level on each of said individual leads in a predetermined sequence and to develop a corresponding data stream of analog signals in a corresponding sequence at an output thereof, said data stream containing information separately representative of the signal level sensed by each individual element for determining the individual fuel measurements at the locations of said elements.

48. The junction probe of claim 47 further including timing and control circuitry for driving the multiplexer to measure said signals in said predetermined sequence in response to an applied synchronizing signal.

49. The junction probe of claim 48 further including a transmission line driver stage coupled to receive the data stream output of the multiplexer and apply a corresponding analog data stream to a common output signal path.

50. The combination of a pair of junction probes in accordance with claim 49 interconnected in a master/slave configuration for installation in the same fuel tank, the second junction probe of said pair being configured to operate as a slave probe and being connected to a separate set of tank mounted elements to develop a multiplexed signal data stream according to individual analog signals from the second set of elements measured in sequence and apply the analog data stream to the first junction probe of said pair, said first junction probe being configured to operate as a master junction probe and further including a slave receiver for receiving the analog data stream from the slave junction probe and applying said data stream to the transmission line driver of the master junction probe for combining with the data stream from the master junction probe multiplexer, whereby the transmission line driver provides an analog data stream output including the analog data streams from both junction probes in series with each other.

51. The junction probe of claim 48 wherein said timing and control circuitry includes means for injecting calibration signals in the sequence of tank mounted element signals for use in detecting drift in analog signal reference level due to variations in circuit parameters with time.

52. A multiplexed fuel gaging system for aircraft having at least one fuel tank with multiple fuel sensing units comprising:

a plurality of elements mounted within a tank for sensing fuel and providing separate individual signals corresponding to fuel measurement;

signal processing apparatus on board the aircraft for converting analog data signals to digital values corresponding to measured fuel quantity;

a multiplexer associated with a tank and including circuitry separately coupled to the individual tank mounted elements, the multiplexer also being coupled to the signal processing apparatus by a common signal path;

first circuit means included in the multiplexer for electrically driving said elements; and second circuit means in the multiplexer for individually measuring said plurality of elements in a predetermined sequence and forming a data stream of analog signals corresponding to the sequence of signals from said elements for transmission to the signal processing apparatus over said common signal path, said data stream containing information separately representative of each individual element for processing in said signal processing apparatus to determine the fuel measurement at each individual element which is measured.

* * * * *